United States Patent
Yamada

(10) Patent No.: US 12,482,858 B2
(45) Date of Patent: *Nov. 25, 2025

(54) METAL ELEMENT-CONTAINING SULFIDE-TYPE SOLID ELECTROLYTE AND METHOD FOR PRODUCING SAME

(71) Applicant: IDEMITSU KOSAN CO., LTD., Tokyo (JP)

(72) Inventor: Hiroaki Yamada, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,950

(22) Filed: May 31, 2024

(65) Prior Publication Data

US 2024/0322227 A1    Sep. 26, 2024

Related U.S. Application Data

(63) Continuation of application No. 16/763,440, filed as application No. PCT/JP2018/042174 on Nov. 14, 2018, now Pat. No. 12,034,112.

(30) Foreign Application Priority Data

Nov. 14, 2017 (JP) ................... 2017-219189

(51) Int. Cl.
H01M 10/0562 (2010.01)
H01M 10/0525 (2010.01)

(52) U.S. Cl.
CPC ... *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

2010/0290969 A1   11/2010   Deiseroth et al.
2013/0040208 A1   2/2013   Kanno et al.
(Continued)

FOREIGN PATENT DOCUMENTS

CN   101013761 A   8/2007
CN   101821199 A   9/2010
(Continued)

OTHER PUBLICATIONS

English language machine translation of WO-2011118801-A1 (Year: 2025).*

(Continued)

*Primary Examiner* — Eli S Mekhlin
(74) *Attorney, Agent, or Firm* — Oblon, McClelland, Maier & Neustadt, L.L.P.

(57) ABSTRACT

A metal element-containing sulfide solid electrolyte may suppress $H_2S$ generation. Such a metal element-containing sulfide solid electrolyte may include a lithium element, a sulfur element, a phosphorus element, a halogen element, and at least one metal element selected from metal elements of Groups 3 to 12 and Period 4 or higher of the Periodic Table, in which the molar ratio of the lithium element to the phosphorus element (Li/P) is 2.4 or more and 12 or less, and the molar ratio of the sulfur element to the phosphorus element (S/P) is 3.7 or more and 12 or less.

17 Claims, 2 Drawing Sheets

(56) References Cited

U.S. PATENT DOCUMENTS

| | | | |
|---|---|---|---|
| 2014/0193693 A1* | 7/2014 | Hoshina | H01M 4/525 |
| | | | 429/304 |
| 2014/0302382 A1 | 10/2014 | Kambara et al. | |
| 2015/0118574 A1 | 4/2015 | Visbal et al. | |
| 2015/0171464 A1 | 6/2015 | Kambara et al. | |
| 2016/0028106 A1 | 1/2016 | Kato | |
| 2016/0104917 A1 | 4/2016 | Sato et al. | |
| 2018/0145369 A1 | 5/2018 | Sung et al. | |
| 2018/0351148 A1 | 12/2018 | Schneider et al. | |

FOREIGN PATENT DOCUMENTS

| | | | | |
|---|---|---|---|---|
| CN | 104025363 A | | 9/2014 | |
| CN | 104412338 A | | 3/2015 | |
| CN | 106611872 A | | 5/2017 | |
| CN | 106684432 A | * | 5/2017 | H01M 10/052 |
| JP | 60-84772 A | | 5/1985 | |
| JP | 2001-6674 A | | 1/2001 | |
| JP | 2011-44249 A | | 3/2011 | |
| JP | 2011-124081 A | | 6/2011 | |
| JP | 2012-48971 A | | 3/2012 | |
| JP | 2013-33659 A | | 2/2013 | |
| JP | 2013-201110 A | | 10/2013 | |
| JP | 2016-24967 A | | 2/2016 | |
| JP | 2017-45613 A | | 3/2017 | |
| JP | 2017-117639 A | | 6/2017 | |
| JP | 2018-85320 A | | 5/2018 | |
| WO | WO-2011118801 A1 | * | 9/2011 | C01B 17/20 |
| WO | WO 2013/136524 A1 | | 9/2013 | |
| WO | WO 2014/192309 A1 | | 12/2014 | |

OTHER PUBLICATIONS

English language machine translation of CN-106684432-A. (Year: 2025).*

Office Action issued Aug. 8, 2023, in corresponding Japanese Patent Application No. 2019-554261 (with English Translation), 12 pages.

Japanese Office Action issued Feb. 28, 2023 in Japanese Application 2019-554261, (with unedited computer-generated English translation), 5 pages.

Notice of Reasons for Refusal issued Oct. 4, 2022 in Japanese Patent Application No. 2019-554261 (with English machine translation), citing document 15 therein, 5 pages.

Combined Chinese Office Action and Search Report issued Aug. 2, 2021 in Patent Application No. 201880073327.8 (with English translation of Category of Cited Documents), citing documents 16-20 therein, 14 pages.

International Search Report issued Feb. 19, 2019 in PCT/JP2018/042174 filed Nov. 14, 2019, citing documents 3-9 and 21-32 therein, 2 pages.

Ujiie et al., "Preparation and electrochemical characterization of (100-x)(0.7Li$_2$S 0.3P$_2$S$_5$) xLiBr glass-ceramic electrolytes," Mater Renew Sustain Energy, vol. 3, No. 18, 2014, pp. 1-8.

English language machine translation of 60-84772 A, 4 pages.

United States Office Action issued Oct. 18, 2023 in U.S. Appl. No. 16/763,440, 17 pages.

Japanese Office Action issued Aug. 13, 2024 in Japanese Patent Application No. 2023-089722 (with English translation), 6 pages.

Combined Chinese Office Action and Search Report issued Mar. 15, 2025, in Chinese Patent Application No. 202210769327.X (with unedited computer-generated English translation), citing document 15 therein, 24 pages.

Official communication issued in CN application 202210769327.X on Aug. 23, 2025 (with machine translation).

* cited by examiner

METAL ELEMENT-CONTAINING SULFIDE-TYPE SOLID ELECTROLYTE AND METHOD FOR PRODUCING SAME

CROSS-REFERENCE TO RELATED APPLICATIONS

The present application is a continuing application claiming priority to U.S. application Ser. No. 16/763,440, filed May 12, 2020, and published as US 2020/0358132 A1, on Nov. 12, 2020, which was the national stage of international application PCT/JP2018/042174, filed on Nov. 14, 2018, and claims the benefit of the filing date of Japanese Appl. No. 2017-219189, filed on Nov. 14, 2017.

BACKGROUND OF THE INVENTION

Technical Field

The present invention relates to a metal element-containing sulfide solid electrolyte and a method for producing it.

Background Art

With rapid spread of information-related instruments, communication instruments and others such as personal computers, video cameras and cell phones in recent years, development of batteries that are utilized as power sources for them is considered to be important. Among such batteries, lithium batteries are specifically noted from the viewpoint of realizing a high energy density.

Lithium batteries that are now on market use an electrolytic solution containing a combustible organic solvent, and therefore it is necessary to fit a safety device for preventing temperature elevation in short circuit and to make improvement in point of configurations and materials for prevention of short circuit. As opposed to this, a lithium battery in which the electrolytic solution is changed to a solid electrolyte layer so that the battery is solid as a whole is considered to be excellent in production cost reduction and productivity since a combustible organic solvent is not used in the battery and the safety device to be therein can be simplified.

As a solid electrolyte to be used in such a solid electrolyte layer, a sulfide solid electrolyte is known. A sulfide solid electrolyte has a high Li ion conductivity and is therefore useful for increasing power of batteries, and various studies thereon have heretofore been made.

For example, a sulfide solid electrolyte using, as starting materials, lithium sulfide, diphosphorus pentasulfide, lithium bromide, lithium iodide and others and containing a lithium element, a phosphorus element, a sulfur element, a halogen element and others is disclosed (for example, PTLs 1 and 2). In addition, NPL 1 discloses a $Li_2S$—$P_2S_5$—LiBr-based sulfide solid electrolyte produced by adding diphosphorus pentasulfide to a mixture prepared by mixing lithium sulfide and lithium bromide.

Citation List

PTL 1: JP 2012-048971 A
PTL 2: JP 2013-201110 A
NPL 1: Mater Renew Sustain Energy (2014)

SUMMARY OF THE INVENTION

Technical Problem

The sulfide solid electrolytes described in the above-mentioned PTLs and NPL may often generate hydrogen sulfide because of the reason that hydrolysis thereof goes on owing to contact thereof with moisture such as that in air. Consequently, when a sulfide solid electrolyte is used to assemble a lithium battery, hydrogen sulfide may form during assembly operation to cause a problem of worsening working environments.

The present invention has been made in consideration of such situations, and an object thereof is to provide a metal element-containing sulfide solid electrolyte capable of suppressing hydrogen sulfide generation and capable of expressing excellent working environments, and to provide a method for producing it.

Solution to Problem

For solving the above-mentioned problems, the present inventors have assiduously studied and, as a result, have found that the problems can be solved by the following invention.

[1] A metal element-containing sulfide solid electrolyte containing a lithium element, a sulfur element, a phosphorus element, a halogen element, and at least one metal element selected from metal elements of Groups 2 to 12 and Period 4 or higher of the Periodic Table, in which the molar ratio of the lithium element to the phosphorus element (Li/P) is 2.4 or more and 12 or less, and the molar ratio of the sulfur element to the phosphorus element (S/P) is 3.7 or more and 12 or less.

[2] A method for producing a metal element-containing sulfide solid electrolyte, which includes bringing a sulfide solid electrolyte containing at least a lithium element, a sulfur element and a phosphorus element, or two or more kinds of starting materials containing at least a lithium element, a sulfur element and a phosphorus element, into contact with a metal compound, wherein the molar ratio of the lithium element to the phosphorus element (Li/P) contained in the metal element-containing sulfide solid electrolyte is 2.4 or more and 12 or less, and the molar ratio of the sulfur element to the phosphorus element (S/P) is 3.7 or more and 12 or less, and the metal compound contains at least one metal element selected from metal elements of Groups 2 to 12 and Period 4 or higher of the Periodic Table.

Advantageous Effects of Invention

According to the present invention, there can be provided a metal element-containing sulfide solid electrolyte capable of suppressing hydrogen sulfide generation and capable of expressing excellent working environments, and a method for producing it.

DETAILED DESCRIPTION OF EMBODIMENTS OF THE INVENTION

Figure 1:
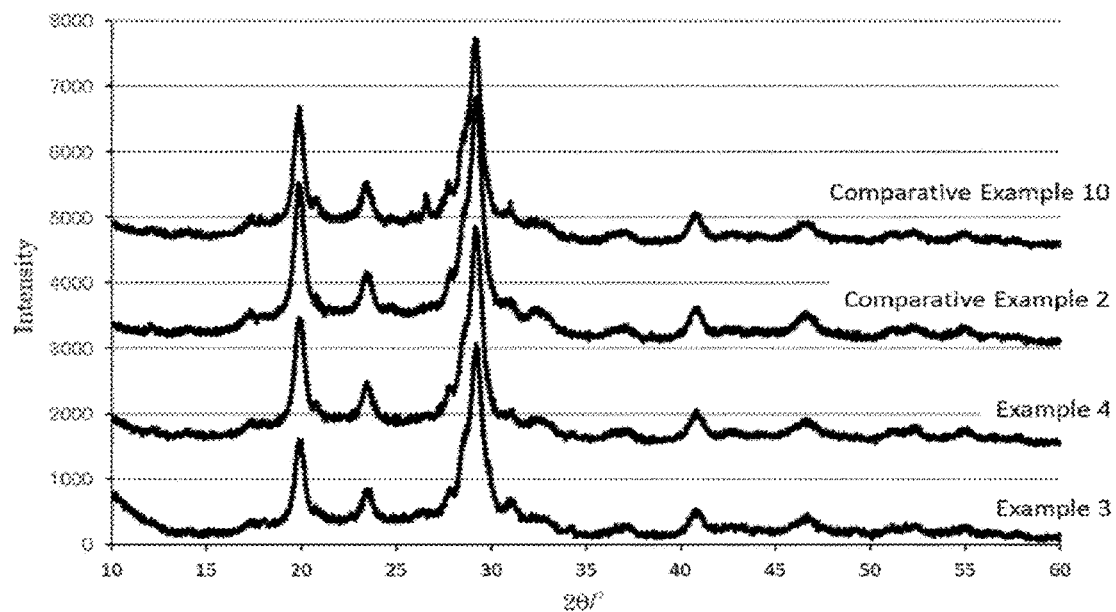
FIG. 1 shows X-ray analysis spectra of crystalline sulfide solid electrolytes of Examples 3 and 4, and Comparative Examples 2 and 10.

Embodiments of the present invention (which can be hereinafter referred to as "the present embodiments") are described below.

Metal Element-Containing Sulfide Solid Electrolyte

The metal element-containing sulfide solid electrolyte of the present invention contains a lithium element, a sulfur element, a phosphorus element, a halogen element, and at least one metal element selected from metal elements of Groups 2 to 12 and Period 4 or higher of the Periodic Table, in which the molar ratio of the lithium element to the phosphorus element (Li/P) is 2.4 or more and 12 or less, and the molar ratio of the sulfur element to the phosphorus element (S/P) is 3.7 or more and 12 or less. The sulfide solid electrolyte is a solid electrolyte containing at least a sulfur element as an essential component, and means an electrolyte that can be solid at 25° C. in a nitrogen atmosphere, and the metal element-containing sulfide solid electrolyte of this embodiment is an electrolyte that contains a lithium element, a phosphorus element, a halogen element and the above-mentioned metal element along with a sulfur element, and can be solid at 25° C. in a nitrogen atmosphere.

The metal element-containing sulfide solid electrolyte of this embodiment contains a lithium element, a sulfur element, a phosphorus element and a halogen element and therefore can be a sulfide solid electrolyte having high battery performance and having a higher ion conductivity, and in addition, as containing a lithium element and a phosphorus element in a predetermined molar ratio and additionally containing specific metal elements in a predetermined molar ratio, the metal element-containing sulfide solid electrolyte can suppress hydrogen sulfide generation, and accordingly, for example, in assembling a lithium battery using the sulfide solid electrolyte, hydrogen sulfide generation can be suppressed and excellent working environments can be expressed.

Regarding the lithium element and the phosphorus element contained in the metal element-containing sulfide solid electrolyte of this embodiment, the molar ratio of the lithium element to the phosphorus element (Li/P) needs to be 2.4 or more and 12 or less. When the molar ratio of lithium element to phosphorus element (Li/P) does not fall within the range, excellent battery performance having a high ion conductivity could not be attained, and an effect of suppressing hydrogen sulfide generation could not also be expressed. From the viewpoint of attaining more excellent battery performance and an effect of suppressing hydrogen sulfide generation, the molar ratio of lithium element to phosphorus element (Li/P) is preferably 3.1 or more, even more preferably 3.2 or more, further more preferably 3.4 or more, and the upper limit is preferably 10 or less, more preferably 8 or less, even more preferably 6.5 or less. The molar ratio of lithium element to phosphorus element (Li/P) can be appropriately controlled depending on the kind and the blending amount of the starting materials to be used in producing the metal element-containing sulfide solid electrolyte.

Regarding the sulfur element and the phosphorus element contained in the metal element-containing sulfide solid electrolyte of this embodiment, the molar ratio of the sulfur element and the phosphorus element (S/P) needs to be 3.7 or more and 12 or less. When the molar ratio of sulfur element to phosphorus element (S/P) does not fall within the range, excellent battery performance having a high ion conductivity could not be attained, and an effect of suppressing hydrogen sulfide generation could not also be expressed. From the viewpoint of attaining more excellent battery performance and an effect of suppressing hydrogen sulfide generation, the molar ratio of sulfur element to phosphorus element (S/P) is preferably 3.75 or more, and when more excellent battery performance is specifically noted, the ratio is preferably 3.8 or more. The upper limit is preferably 12 or less, more preferably 8 or less, even more preferably 6 or less, further more preferably 5 or less.

Regarding the metal element and the phosphorus element contained in the metal element-containing sulfide solid electrolyte of this embodiment, the molar ratio of the metal element to the phosphorus element (M/P) is preferably more than 0 and 2 or less. When the molar ratio of metal element to phosphorus element (M/P) falls within the range, an excellent effect of suppressing hydrogen sulfide generation can be attained. From the viewpoint of attaining a more excellent effect of suppressing hydrogen sulfide generation, the molar ratio of metal element to phosphorus element (M/P) is preferably 0.001 or more, more preferably 0.010 or more, even more preferably 0.050 or more, and the upper limit is preferably 1.5 or less, more preferably 1.0 or less, even more preferably 0.5 or less. The molar ratio of metal element to phosphorus element (M/P) can be appropriately controlled depending on the kind and the blending amount of the starting materials to be used in producing the metal element-containing sulfide solid electrolyte.

For identifying the kind of each element contained in the metal element-containing sulfide solid electrolyte of this embodiment and for measuring the content (molar amount) thereof, for example, ICP emission spectrometry, ion chromatography, RBS, AES or fluorescent X-ray fluorescence method can be employed, but excepting any special situation such as difficulty in analysis, data measured through ICP emission spectrometry are employed here. Regarding identification of the kinds of various elements and measurement of content (molar amount) thereof through ICP emission spectrometry, more specifically, the methods described in the section of Examples are referred to.

The halogen element is at least one selected from a fluorine element, a chlorine element, a bromine element and an iodine element, and from the viewpoint of attaining higher battery performance, a chlorine element, a bromine element and an iodine element are preferred, a bromine element and an iodine element are more preferred, and especially preferably, both a bromine element and an iodine element are contained.

The metal elements needs to be at least one selected from metal elements of Groups 2 to 12 and Period 4 or higher of the Periodic Table. Using such a metal element provides an excellent effect of suppressing hydrogen sulfide generation. From the viewpoint of attaining a more excellent effect of suppressing hydrogen sulfide generation, a metal element of Groups 4 to 12 of the Periodic Table is preferred, a metal element of Groups 6 to 12 is more preferred, a metal element of Groups 7 to 12 is even more preferred, and a metal element of Groups 7, 8 and 12 is especially more preferred. However, from the viewpoint of attaining a more excellent effect of suppressing hydrogen sulfide generation, the metal element is preferably any other metal element of Groups 2 to 12 and Period 4 or higher of the Periodic Table than a barium element and a titanium element.

In consideration of versatility, more specifically, metal elements such as a calcium element, a zirconium element, a vanadium element, a molybdenum element, a manganese element, an iron element, a cobalt element, a nickel element, a copper element, a silver element and a zinc element are preferred; and a manganese element, an iron element and a zinc element are more preferred. One alone or plural kinds of these metal elements can be used either singly or as combined.

In this embodiment, the metal element may exist in the sulfide solid electrolyte in any state and, for example, may exist therein as a metal compound such as a metal halide containing a halogen element and a metal element, or a metal sulfide containing a sulfur element and a metal element, or may bond to a sulfur element constituting the sulfide solid electrolyte, or in the sulfide solid electrolyte, these states may coexist at the same time. Specifically, the metal element-containing sulfide solid electrolyte includes one containing the above-mentioned metal compound in a sulfide solid electrolyte and/or one where the above-mentioned metal element bonds to the sulfur element in the sulfide solid electrolyte. As the case can be, the metal element may exist as a metal phosphide or a metal nitride, or, for example, any other metal compound, for example, an organic metal compound or a metal complex.

The metal compound is mainly derived from a metal compound such as a metal halide containing the above-mentioned halogen element and metal element contained in the metal element-containing sulfide solid electrolyte, or a metal sulfide containing a sulfur element and a metal element. The metal compound includes a metal phosphide that contains a phosphorus element and a metal element constituting the metal element-containing sulfide solid electrolyte of this embodiment, and in the case where the metal element-containing sulfide solid electrolyte contains a nitrogen element, the metal compound also includes a metal nitride. Further, as the case can be, the metal compound can be an organic metal compound or a metal complex composed of elements that constitute the metal element-containing sulfide solid electrolyte of this embodiment.

These metal compounds can be formed of a sulfur element, a phosphorus element, a halogen element and a metal element that constitute the metal element-containing sulfide solid electrolyte, or can be derived from a metal compound of the starting material when a metal compound used as the starting material in producing the metal element-containing sulfide solid electrolyte has remained in the resultant product, as mentioned below.

Examples of the metal halide include metal halides, such as metal fluorides such as magnesium fluoride, calcium fluoride, vanadium fluoride, manganese fluoride, iron fluoride, cobalt fluoride, nickel fluoride, copper fluoride, zinc fluoride, zirconium fluoride, molybdenum fluoride, and silver fluoride; metal chlorides such as magnesium chloride, calcium chloride, vanadium chloride, manganese chloride, iron chloride, cobalt chloride, nickel chloride, copper chloride, zinc chloride, zirconium chloride, molybdenum chloride, and silver chloride; metal bromides such as magnesium bromide, calcium bromide, vanadium bromide, manganese bromide, iron bromide, cobalt bromide, nickel bromide, copper bromide, zinc bromide, zirconium bromide, molybdenum bromide, and silver bromide; and metal iodides such as magnesium iodide, calcium iodide, vanadium iodide, manganese iodide, iron iodide, cobalt iodide, nickel iodide, copper iodide, zinc iodide, zirconium iodide, molybdenum iodide, and silver iodide. Examples of the metal sulfide, the metal phosphide and the metal nitride include those prepared by substituting the halogen element in the above-mentioned metal halides with a sulfur element, a phosphorus element or a nitrogen element. In the metal element-containing sulfide solid electrolyte, one alone or plural kinds of these metal compounds may exist either singly or as combined.

Above all, from the viewpoint of improving the effect of suppressing hydrogen sulfide generation and improving battery performance, metal bromides, metal iodides and metal sulfides are more preferred; and in consideration of easy handleability, metal bromides and metal sulfides are preferred; and more specifically, calcium bromide, manganese bromide, iron bromide, zinc bromide, zinc iodide and manganese sulfide are preferred, and manganese bromide, iron bromide, zinc bromide, zinc iodide and manganese sulfide are more preferred.

The metal element-containing sulfide solid electrolyte containing the above-mentioned elements can be amorphous or crystalline.

Amorphous metal element-containing sulfide solid electrolytes are those that give a halo pattern of an X-ray diffraction pattern substantially not having any other peak than material-derived peaks in X-ray diffractometry, irrespective of the presence or absence of any solid material-derived peak. Examples of the amorphous metal element-containing sulfide solid electrolyte include amorphous precursors of crystalline metal element-containing sulfide solid electrolytes having various crystal structures to be mentioned below, for example, those having a metal compound such as the above-mentioned metal halide or metal sulfide in the basic structure, such as $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$LiI$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n each represent a positive number, Z represents any of Si, Ge, Zn, Ga, Sn, or Al), $Li_2S$—$GeS_2$, $Li_2S$—$SiS_2$—$Li_3PO_4$, $Li_2S$—$SiS_2$—$Li_mZO_n$ (m and n each represent a positive number, Z represents any of P, Si, Ge, B, Al, Ga, or In), or $Li_{10}GeP_2S_{12}$, and/or those in which the sulfur element in the basic structure bonds to the above-mentioned metal element. The kind and the content of the element constituting the amorphous sulfide solid electrolyte can be identified, for example, using an ICP emission spectrometer.

The shape of the amorphous metal element-containing sulfide solid electrolyte is not specifically defined, but examples thereof include granular ones. The average particle size ($D_{50}$) of the granular amorphous metal element-containing sulfide solid electrolyte is, for example, within a range of 0.01 μm to 500 μm, or 0.1 to 200 μm.

Crystalline metal element-containing sulfide solid electrolytes are those that give a solid electrolyte-derived peak in the X-ray diffraction pattern in X-ray diffractometry, regardless of the presence or absence of solid starting material-derived peaks therein. Specifically, crystalline metal element-containing sulfide solid electrolytes can be those containing a solid electrolyte-derived crystal structure in which a part of the crystal structure is a metal element-containing solid electrolyte-derived crystal structure, or those in which the crystal structure is entirely a metal element-containing solid electrolyte-derived crystal structure. The crystalline metal element-containing sulfide solid electrolyte may partly contain an amorphous metal element-containing solid electrolyte, so far as it has an X-ray diffraction pattern as mentioned above.

More specifically, examples of the crystal structure of the crystalline metal element-containing sulfide solid electrolyte include an $Li_3PS_4$ crystal structure; an $Li_4P_2S_6$ crystal structure; an $Li_7PS_6$ crystal structure; an $Li_7P_3S_{11}$ crystal structure; an $Li_8P_2S_6$ crystal structure; an $Li_{4-m}Ge_{1-m}P_mS_4$ thio-LISICON Region II crystal structure (see Kanno et al., Journal of The Electrochemical Society, 148 (7) A742-746 (2001)); a crystal structure similar to the $Li_{4-m}Ge_{1-m}P_mS_4$-based thio-LISICON Region II-type crystal structure (see Solid State Ionics, 177 (2006), 2721-2725) (in this description, the thio-LISICON Region II crystal structure and the crystal structure similar thereto are, as combined, referred to as "thio-LISICON Region II crystal structure"); and an argyrodite-type crystal structure (see Adam et al., Solid State Ionics, (230.72.2013)).

Examples of the argyrodite-type crystal structure include an $Li_7PS_6$ crystal structure; a crystal structure having a structure skeleton of $Li_7PS_6$, in which a part of P is substituted with Si to have a compositional formula $Li_{7-m}P_{1-n}Si_nS_6$ or $Li_{7+m}P_{1-n}Si_nS_6$ (m represents −0.6 to 0.6, and n represents 0.1 to 0.6); a crystal structure represented by $Li_{7-m-2n}PS_{6-m-n}Cl_m$ (0.8≤m≤1.7, 0<n≤−0.25 m+0.5); and a crystal structure represented by $Li_{7-m}PS_{6-m}Ha_m$ (Ha represents a chlorine element and/or a bromine element, m represents 0.2 to 1.8).

The kind and the content of the element that constitutes the crystalline metal element-containing sulfide solid electrolyte can be identified, for example, using an ICP emission spectrometer.

The crystalline metal element-containing sulfide solid electrolyte includes those having a metal compound such as a metal halide or a metal sulfide in the crystalline sulfide solid electrolyte having the above-mentioned structure and/or those in which the sulfur element in the crystalline structure bonds to the above-mentioned metal element.

The shape of the crystalline metal element-containing sulfide solid electrolyte is not specifically defined, but examples thereof include granular ones. The average particle size ($D_{50}$) of the granular crystalline metal element-containing sulfide solid electrolyte is, for example, within a range of 0.01 μm to 500 μm, or 0.1 to 200 μm.

A method for producing the metal element-containing sulfide solid electrolyte of this embodiment is not specifically limited, but for example, the solid electrolyte can be produced (1) by bringing a sulfide solid electrolyte into contact with a metal compound, for example, by bringing a sulfide solid electrolyte containing a lithium element, a sulfur element and a phosphorus element into contact with the above-mentioned metal compound, or by bringing a sulfide solid electrolyte containing a lithium element, a sulfur element, a phosphorus element and a halogen element into contact with the above-mentioned metal compound, or (2) by bringing starting material to be used in producing a sulfide solid electrolyte into contact the above-mentioned metal compound, for example, by bringing two or more kinds of starting materials containing a lithium element, a sulfur element and a phosphorus element for use in producing a sulfide solid electrolyte into contact with the above-mentioned metal compound, or by bringing two or more kinds of starting materials containing a lithium element, a sulfur element, a phosphorus element and a halogen element into contact with the above-mentioned metal compound. More specifically, the metal element-containing sulfide solid electrolyte of this embodiment can be produced according to the production method for the metal element-containing sulfide solid electrolyte of this embodiment to be mentioned hereinunder.

A crystalline metal element-containing sulfide solid electrolyte can be produced by heating an amorphous metal element-containing sulfide solid electrolyte or, for example, an argyrodite-type crystal structure-having, crystalline metal element-containing sulfide solid electrolyte can be produced by reacting starting materials in a predetermined blending ratio, for example, by blending them, not via an amorphous metal element-containing sulfide solid electrolyte.

In the method for producing the metal element-containing sulfide solid electrolyte of this embodiment, the halogen element to be contained in the sulfide solid electrolyte can be the same as the halogen element of the metal halide to be used as the above-mentioned metal compound or may differ from the latter, but preferably the two are the same. For example, for an amorphous sulfide solid electrolyte having lithium bromide in the basic structure (for example, $Li_2S$—$P_2S_5$—LiBr), when zinc bromide is used as the metal halide to be brought into contact with it, substitution reaction between at least a part of the zinc element in the metal halide and the lithium element bonding to the sulfur element in the sulfide solid electrolyte gives a part that bonds to the sulfur element in the sulfide solid electrolyte, while on the other hand, the substituted lithium element reacts with a bromine element to give lithium bromide. In that manner, when the halogen element contained in the basic structure is the same as the halogen element in the metal halide, the lithium halide produced as a side product can be one already existing in the basic structure of the sulfide solid electrolyte, and therefore any negative influence of the side product on the battery performance can be suppressed more readily to give a sulfide solid electrolyte in a more stable manner.

The metal element-containing sulfide solid electrolyte of this embodiment has an effect of suppressing hydrogen sulfide generation and can express excellent working environments, and therefore can be favorably used for lithium batteries. In the case where a lithium element is used as a conductive species, it is especially favorable. The metal element-containing sulfide solid electrolyte of this embodiment can be used as a positive electrode layer or can be used as a negative electrode layer, or may also be used as an electrolyte layer. These layers can be produced according to known methods.

Preferably, the battery uses a collector in addition to the positive electrode layer, the electrolyte layer and the negative electrode layer, and the collector may be any known one. For example, a layer of Au, Pt, Al, Ti, or a layer formed by coating one reactive with the sulfide-based solid electrolyte, such as Cu, with Au or the like can be used.

Production Method for Metal Element-Containing Sulfide Solid Electrolyte

A method for producing the metal element-containing sulfide solid electrolyte of this embodiment includes bringing a sulfide solid electrolyte containing at least a lithium element, a sulfur element and a phosphorus element, or two or more kinds of starting materials containing at least a lithium element, a sulfur element and a phosphorus element, into contact with a metal compound, wherein the molar ratio of the lithium element to the phosphorus element (Li/P) contained in the metal element-containing sulfide solid electrolyte is 2.4 or more and 12 or less, and the molar ratio of the sulfur element to the phosphorus element (S/P) is 3.7 or more and 12 or less, and the metal compound contains at least one metal element selected from metal elements of Groups 2 to 12 and Period 4 or higher of the Periodic Table.

Specifically, the production method for the metal element-containing sulfide solid electrolyte of this embodiment is roughly grouped into a production method (1) where a sulfide solid electrolyte is first produced using starting materials containing at least a lithium element, a sulfur element and a phosphorus element and then the sulfide solid electrolyte is brought into contact with a metal element, and a production method (2) where starting materials for use in producing the sulfide solid electrolyte are brought into contact with the metal compound. First, the production method (1) where a sulfide solid electrolyte is brought into contact with a metal element is described.

Production of Sulfide Solid Electrolyte

The method for producing a sulfide solid electrolyte to be used in the production method for the metal element-containing sulfide solid electrolyte of this embodiment is not specifically defined, but for example, the sulfide solid electrolyte can be produced by reacting, for example, two or more kinds of starting materials containing a lithium element, a sulfur element and a phosphorus element, preferably two or more kinds of starting material containing a lithium element, a sulfur element, a phosphorus element and a halogen element, in the absence of a solvent or in any other solvent than water. Specifically, the sulfide solid electrolyte to be used in the production method for the metal element-containing sulfide solid electrolyte of this embodiment is one containing a lithium element, a sulfur element and a phosphorus element, preferably one containing a lithium element, a sulfur element, a phosphorus element and a halogen element.

Regarding the reaction of starting materials, the starting materials containing a lithium element, a sulfur element and a phosphorus element, preferably the starting materials containing a lithium element, a sulfur element, a phosphorus element and a halogen element are mixed, stirred or ground, or processed through a combination of these treatments.

Preferred examples of the starting material containing a lithium element include lithium compounds such as lithium sulfide ($Li_2S$), lithium oxide ($Li_2O$), and lithium carbonate ($Li_2CO_3$); and an elementary lithium metal. One alone or plural kinds of these can be used either singly or as combined. As the lithium compound, lithium sulfide ($Li_2S$) is preferred from the viewpoint of attaining a higher ion conductivity and excellent battery performance. Lithium sulfide ($Li_2S$) is a material containing a lithium element an a sulfur element, and in this embodiment, the starting material may contain a lithium element and a sulfur element like this, or can be a starting material of a lithium element alone such as an elementary lithium metal, or may also be a material containing a lithium element and any other element than a sulfur element and a phosphorus element, such as the above-mentioned lithium oxide ($Li_2O$), and lithium carbonate ($Li_2CO_3$).

The starting material containing a sulfur element is preferably one that contains a sulfur element among the above-mentioned lithium element-containing starting material and the phosphorus element-containing starting material. The starting material containing a sulfur element is also preferably an alkali metal sulfide such as sodium sulfide ($Na_2S$), potassium sulfide ($K_2S$), rubidium sulfide ($Rb_2S$), and cesium sulfide ($Cs_2S$). Among these alkali metal sulfides, sodium sulfide ($Na_2S$) is more preferred in consideration of the fact that the ion conductivity tends to increase when an alkali metal having a smaller molecular weight is used. The alkali metal sulfide includes lithium sulfide ($Li_2S$) that has been exemplified hereinabove as a material that contains lithium, and in consideration of the fact that an alkali metal having a smaller molecular weight is preferred from the viewpoint of attaining an increased ion conductivity, lithium sulfide ($Li_2S$) is needless-to-say preferred.

Preferred examples of the material containing a phosphorus element include phosphorus sulfides such as diphosphorus trisulfide ($P_2S_3$), and diphosphorus pentasulfide ($P_2S_5$); phosphorus compounds, such as silicon sulfide ($SiS_2$), germanium sulfide ($GeS_2$), boron sulfide ($B_2S_3$), gallium sulfide ($Ga_2S_3$), tin sulfide ($SnS$ or $SnS_2$), aluminum sulfide ($Al_2S_3$), zinc sulfide ($ZnS$), and sodium phosphate ($Na_3PO_4$), and elementary phosphorus. One alone or plural kinds of these can be used either singly or as combined. As the phosphorus compound, phosphorus sulfide is preferred from the viewpoint of attaining an increased ion conductivity and attaining excellent battery performance, and diphosphorus pentasulfide ($P_2S_5$) is more preferred. As phosphorus compounds such as diphosphorus pentasulfide ($P_2S_5$) and elementary phosphorus, those industrially produced and commercially sold can be used with no specific limitation.

In this embodiment, from the viewpoint of attaining a higher ionic conductivity and attaining excellent battery performance, a halogen element-containing material is preferably used.

Preferred examples of the halogen element-containing material include a substance represented by the following general formula (1) (hereinafter this can be referred to as "substance $X_2$"):

$$X_2 \qquad (1),$$

wherein X represents a halogen element.

The substance $X_2$ includes fluorine ($F_2$), chlorine ($Cl_2$), bromine ($Br_2$), and iodine ($I_2$), and from the viewpoint of obtaining a solid electrolyte having a high ion conductivity, chlorine ($Cl_2$), bromine ($Br_2$), and iodine ($I_2$) are preferred, and bromine ($Br_2$), and iodine ($I_2$) are more preferred. One alone or plural kinds of these substances $X_2$ can be used either singly or as combined.

Preferably, the content of water contained in the substance $X_2$ as an impurity is small.

In this embodiment, as starting materials containing a lithium element, a sulfur element, a phosphorus element and a halogen element, for example, the following materials can also be used in addition to the above-mentioned materials.

Using a metal sulfide such as silicon sulfide ($SiS_2$), germanium sulfide ($GeS_2$), boron sulfide ($B_2S_3$), gallium sulfide ($Ga_2S_3$), tin sulfide ($SnS$ or $SnS_2$), aluminum sulfide ($Al_2S_3$), or zinc sulfide ($ZnS$), a sulfur atom can be supplied.

Using phosphorus halides such as various phosphorus fluorides ($PF_3$, $PF_5$), various phosphorus chlorides ($PCl_3$, $PCl_5$, $P_2Cl_4$), phosphorus oxychloride ($POCl_3$), various phosphorus bromides ($PBr_3$, $PBr_5$), phosphorus oxybromide ($POBr_3$), and various phosphorus iodides ($PI_3$, $P_2I_4$), a phosphorus element and a halogen element can be supplied at the same time. In addition, using a thiophosphoryl halide such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2S$), or thiophosphoryl dibromofluoride ($PSBr_2F$), a phosphorus element, a sulfur element and a halogen element can be supplied at the same time.

Using any other metal halide 1 than the above-mentioned metal halides, such as a sodium halide such as sodium iodide (NaI), sodium fluoride (NaF), sodium chloride (NaCl), or sodium bromide (NaBr), or an aluminum halide, a silicon halide, a germanium halide, an arsenic halide, a selenium halide, a tin halide, an antimony halide, a tellurium halide or a bismuth halide, a halogen element can be supplied.

In addition, using a lithium halide such as lithium fluoride (LiF), lithium chloride (LiCl), lithium bromide (LiBr) or lithium iodide (LiI), a lithium element and a halogen element can be supplied.

In this embodiment where starting materials containing a lithium element, a sulfur element and a phosphorus element are used, lithium compounds, alkali metal sulfides and phosphorus compounds are preferably used among the above-mentioned starting materials, and lithium sulfide (LiS) and phosphorus sulfide are preferably used, and combined use of lithium sulfide (LiS) and diphosphorus pentasulfide ($P_2S_5$) is preferred.

In this embodiment where starting materials containing a lithium element, a sulfur element, a phosphorus element and a halogen element are used, lithium compounds, alkali metal sulfides, phosphorus compounds, substances $X_2$ and lithium halides are preferably used among the above-mentioned starting materials, and use of lithium sulfide (LiS), phosphorus sulfide, a substance $X_2$ and a lithium halide, or use of lithium sulfide (LiS), phosphorus sulfide and a substance $X_2$ is more preferred, and use of lithium sulfide (LiS), diphosphorus pentasulfide ($P_2S_5$), bromine ($Br_2$) and/or iodine ($I_2$), and lithium bromide LiBr) and/or lithium iodide (LiI), or use of lithium sulfide (LiS), diphosphorus pentasulfide ($P_2S_5$), bromine ($Br_2$) and/or iodine ($I_2$) is even more preferred.

The amount to be used of the starting material containing a lithium element, a sulfur element and a phosphorus element is not specifically limited so far as the molar ratio of the lithium element to the phosphorus element (Li/P) is 2.4 or more and 12 or less, and the molar ratio of the sulfur element to the phosphorus element (S/P) is 3.7 or more and 12 or less, and can be appropriately determined based on the desired solid electrolyte having a crystal structure. For example, in the case where lithium sulfide ($Li_2S$) and diphosphorus pentasulfide ($P_2S_5$) are used as starting materials, the proportion of lithium sulfide ($Li_2S$) to the total of lithium sulfide ($Li_2S$) and diphosphorus pentasulfide ($P_2S_5$) is, from the viewpoint of obtaining a solid electrolyte having high chemical stability, having a higher ion conductivity and having excellent battery performance as employing a composition near an ortho composition, preferably 68 mol % or more, more preferably 70 mol % or more, even more preferably 72 mol % or more, further more preferably 74 mol % or more, and the upper limit is preferably 82 mol % or less, more preferably 80 mol % or less, even more preferably 78 mol % or less, especially preferably 76 mol % or less.

In the case where lithium sulfide ($Li_2S$) and diphosphorus pentasulfide ($P_2S_5$) are used as starting materials and where a substance $X_2$ is used as a halogen element-containing starting material, the proportion of the molar number of lithium sulfide ($Li_2S$) excluding the same molar number of lithium sulfide ($Li_2S$) as the molar number of the substance $X_2$ to the total molar number of lithium sulfide ($Li_2S$) excluding the same molar number of lithium sulfide ($Li_2S$) as the molar number of the substance $X_2$ and the molar number of diphosphorus pentasulfide ($P_2S_5$) is, from the viewpoint of attaining a higher ion conductivity and attaining excellent battery performance, preferably 60 mol % or more, more preferably 65 mol % or more, even more preferably 68 mol % or more, further more preferably 72 mol % or more, especially more preferably 73 mol % or more, and the upper limit is 90 mol % or less, more preferably 85 mol % or less, even more preferably 82 mol % or less, further more preferably 78 mol % or less, especially more preferably 77 mol % or less.

In the case where an alkali metal sulfide such as lithium sulfide ($Li_2S$) and a phosphorus compound and a substance $X_2$ are used as starting materials, the content of the substance $X_2$ to the total amount of the alkali metal sulfide, the phosphorus compound and the substance $X_2$ is, from the viewpoint of attaining a higher ion conductivity and attaining excellent battery performance, preferably 1 mol % or more, more preferably 2 mol % or more, even more preferably 3 mol % or more, and the upper limit is preferably 50 mol % or less, more preferably 40 mol % or less, even more preferably 25 mol % or less, further more preferably 15 mol % or less.

In the case where an alkali metal sulfide such as lithium sulfide ($Li_2S$), a phosphorus compound, a substance $X_2$ and a lithium halide are used as starting materials, the content ($\alpha$ mol %) of the substance $X_2$ to the total amount of these and the content ($\beta$ mol %) of the lithium halide thereto preferably satisfy the following numerical expression (1), more preferably the following numerical expression (2), even more preferably the following numerical expression (3) and further more preferably the following numerical expression (4).

$$2 \leq 2\alpha + \beta \leq 100 \qquad \text{Numerical Expression (1)}$$
$$4 \leq 2\alpha + \beta \leq 80 \qquad \text{Numerical Expression (2)}$$
$$6 \leq 2\alpha + \beta \leq 50 \qquad \text{Numerical Expression (3)}$$
$$6 \leq 2\alpha + \beta \leq 30 \qquad \text{Numerical Expression (4)}$$

In the case where the starting material contains two kinds of halogen elements, and where the molar number of the halogen element in one starting material is represented by $XM_1$ and the molar number of the halogen element in the other starting material is represented by $XM_2$, the proportion of $XM_1$ to the total of $XM_1$ and $XM_2$ is preferably 1 mol % or more, more preferably 10 mol % or more, even more preferably 20 mol % or more, further more preferably 30 mol % or more, and the upper limit is preferably 99 mol % or less, more preferably 90 mol % or less, even more preferably 80 mol % or less, further more preferably 70 mol % or less.

In the case where the starting material contains a bromine element and an iodine element as halogen elements, and where the molar number of the bromine element in the starting material is represented by $BM_1$ and the molar number of the iodine element in the starting material is represented by $IM_2$, $BM_1/IM_1$ is preferably (1 to 99)/(99 to 1), more preferably 15/85 to 90/10, even more preferably 20/80 to 80/20, further more preferably 30/70 to 75/25, especially more preferably 35/65 to 75/25.

In the case where a sulfide solid electrolyte having a thio-LISICON Region II crystal structure and containing a halogen element is desired to be obtained, the molar amount of each element is, as lithium element/phosphorus element, preferably 2.5 or more, more preferably 3.0 or more, even more preferably 3.5 or more, and the upper limit is preferably 5.0 or less, more preferably 4.5 or less, even more preferably 4.0 or less. In the case, sulfur element/phosphorus element is preferably 2.5 or more, more preferably 3.0 or more, even more preferably 3.5 or more, and the upper limit is preferably 5.0 or less, more preferably 4.8 or less, even more preferably 4.5 or less.

Further in the case, total of halogen elements/phosphorus element is preferably 0.1 or more, more preferably 0.3 or more, even more preferably 0.5 or more, and the upper limit is preferably 1.5 or less, more preferably 1.3 or less, even more preferably 1.0 or less.

In the case where a sulfide solid electrolyte having a halogen element-containing argyrodite-type crystal structure is desired to be obtained, the molar amount of each element is, as lithium element/phosphorus element, preferably 2.5 or more, more preferably 3.5 or more, even more preferably 4.5 or more, and the upper limit is 7.0 or less, more preferably 6.0 or less, even more preferably 5.5 or less.

In the case, sulfur element/phosphorus element is preferably 3.0 or more, more preferably 3.5 or more, even more preferably 4.0 or more, and the upper limit is preferably 6.0 or less, more preferably 5.5 or less, even more preferably 5.0 or less.

Further in the case, total of halogen elements/phosphorus element is preferably 0.5 or more, more preferably 0.8 or more, even more preferably 1.0 or more, and the upper limit is preferably 2.5 or less, more preferably 2.3 or less, even more preferably 2.0 or less.

In the production method of this embodiment, the starting materials can be reacted, for example, in the absence of a solvent or in a solvent except water. When water is used as a solvent, it may worsen the performance of the resultant solid electrolyte, and therefore preferably water is not used as a solvent.

Preferably, the reaction is carried out in an atmosphere of an inert gas such as nitrogen or argon.

As the solvent except water, a water-insoluble solvent generally used in the art can be used here, and is preferably a solvent that does not dissolve the resultant sulfide solid electrolyte. Examples of such water-insoluble solvents include nitrile compounds such as acetonitrile, methoxyacetonitrile propionitrile, methoxypropionitrile, isobutyronitrile and benzonitrile; ether compounds such as diethyl ether, dibutyl ether, dimethyl ether, methyl ethyl ether, dipropyl ether, dibutyl ether, cyclopentyl methyl ether, anisole, tetrahydrofuran, methyl cellosolve, ethyl cellosolve, butyl cellosolve, diethylene glycol monomethyl ether, and diethylene glycol monoethyl ether; alcohol compounds such as ethanol, butanol, hexanol, methylhexanol, and ethylhexanol; amide compounds such as dimethylformamide, dimethylacetamide, and methylpyrrolidone; ketone compounds such as acetone and methyl ethyl ketone; aromatic compounds such as benzene, toluene, xylene, mesitylene, ethylbenzene, tert-butylbenzene, trifluoromethylbenzene and nitrobenzene; and aliphatic compounds such as hexane, pentane, 2-ethylhexane, heptane, octane, decane, undecane, dodecane and tridecene. Above all, nitrile compounds and ether compounds are preferred, and isobutyronitrile, dibutyl ether and diethyl ether are more preferred. In the production method of this embodiment, one alone or plural kinds of the above-mentioned water-insoluble solvents can be used either singly or as combined.

The amount of the solvent to be used is preferably such that the total amount of the starting materials could be 0.01 to 1 kg in 1 liter of the solvent, more preferably 0.05 to 0.8 kg, even more preferably 0.2 to 0.7 kg. When the amount of the solvent used falls within the above range, the starting materials can be slurry and can be more smoothly reacted.

Regarding the reaction of the starting materials, from the viewpoint of increasing the reaction speed to efficiently produce a sulfide solid electrolyte, for example, the starting materials can be mixed, stirred or ground or can be processed through any of these treatments as combined, and preferably, the starting materials are at least mixed for reaction thereof.

The mixing method is not specifically limited. For example, starting materials and optionally a solvent can be put into a production device where the solvent and the starting materials can be mixed, and mixed therein. The production device is not specifically limited so far as starting materials and a solvent optionally used can be mixed therein, and for example, a medium-assisted grinding machine can be used.

The medium-assisted grinding machine can be roughly grouped into a container-driven grinding machine and a medium-stirring grinding machine. The container-driven grinding machine includes a stirring tank, a grinding tank, and a ball mill and a bead mill including these as combined. The medium-stirring grinding machine includes various types of grinding machines of an impact grinding machine such as a cutter mill, a hammer mill and a pin mill; a tower-type grinding machine such as a tower mill; a stirring tank grinding machine such as an attritor, an aquamizer, and a sand grinder; a fluid tank grinding machine such as a viscomill, and a pear mill; a fluid tube grinding machine; an annular type grinding machine such as a co-ball mill; a continuous dynamic grinding machine; and a monoaxial or multiaxial kneading machine.

These grinding machines can be appropriately selected depending on the intended size thereof, and for a relatively small-size system, a container-driven grinding machine such as a ball mill or a bead mill can be used, while for large-scale or industrial-scale mass production, the other types of grinding machines are preferably used.

When these grinding machines are used, starting materials and a solvent optionally used, and also grinding media are put thereinto, and then the machine is driven to attain mixing, stirring and grinding therein. Here, starting materials, a solvent and grinding media are put into the machine, but the order of putting them thereinto is not limited.

In this embodiment, starting materials and a solvent optionally used are mixed, and therefore the starting materials can be brought into contact more readily to promote the reaction therebetween to give a sulfide solid electrolyte. From the viewpoint of promoting the contact between starting materials to give efficiently a sulfide solid electrolyte, it is desirable that a solvent and starting materials are mixed, and further stirred and ground, or processed for treatment of stirring and grinding. From the viewpoint of promoting the contact between starting materials, in particular, a treatment including grinding, namely a treatment of grinding, or stirring and grinding is preferably carried out. In the treatment of grinding, the surfaces of the starting materials can be cut off to make new surfaces thereof exposed out, and as a result, the new surfaces can be brought into contact with the surfaces of the other starting material to further promote the reaction between the starting materials to efficiently produce a sulfide solid electrolyte.

For example, a device of a ball mill or a bead mill is described as an example. In these mills, the grain size of the media therein such as balls or beads (balls generally have a size of $\phi 2$ to 20 mm or so, and beads generally have a size of $\phi 0.02$ to 2 mm or so, the material thereof (for example, metals such as stainless, chrome steel, or tungsten carbide; ceramics such as zirconia or silicon nitride; minerals such as agate), the rotation number of the rotor and the time can be selected to attain mixing, stirring or grinding, or a combined treatment thereof, and the particle size of the resultant sulfide solid electrolyte can be controlled.

In this embodiment, these conditions are not specifically limited. For example, using a ball mill, especially a planetary ball mill, and using balls of ceramics, above all zirconia balls having a size of $\phi 1$ to 10 mm, starting materials can be stirred and ground at a rotor rotation number of 300 to 1,000 rpm for 0.5 to 100 hours.

The temperature in mixing, stirring and grinding is not specifically limited, and can be, for example, 20 to 80° C.

In this embodiment, after starting materials and a solvent have been mixed, starting materials can be further added thereto and mixed, and this operation can be repeated twice or more.

In the case where starting materials and a solvent are mixed and stirred, additional starting materials can be further added and mixed during mixing and stirring them and/or after that, and this operation can be repeated twice or more. For example, starting materials and a solvent are put into a ball mill or a bead mill, and mixed and stirred therein, and during the mixing and stirring, additional starting materials can be further put into the container, and after mixing and stirring them (after the mixing and stirring is once stopped), starting materials can be put into the container, and mixing and stirring them can be restarted, or during mixing and stirring, and after that, additional starting materials can be put into the container.

Also in the case where starting materials and solvent are mixed and ground, or stirred and ground, additional starting materials can be further added like in the above-mentioned case of stirring.

In that manner, by further adding starting materials, the frequency of optional treatment of solvent removal or the like can be reduced, and accordingly, a sulfide-based solid electrolyte can be produced more efficiently.

In the case where additional starting materials are further added, if desired, a solvent may also be added, but the solvent will have to be removed in obtaining the intended sulfide solid electrolyte, the amount of the solvent to be additionally added is preferably minimized.

In the case where a solvent is used, the sulfide solid electrolyte produced is in a state containing the solvent, and therefore solvent removal is preferred. In the case where a sulfide solid electrolyte is produced using a solvent, the sulfide solid electrolyte is used generally after dried, and in the case, by previously removing the solvent, the load in drying treatment can be reduced. In the case where a substance $X_2$ is used as a starting material, solvent removal also enables removal of sulfur as a side product.

Solvent removal can be carried out before a sulfide solid electrolyte is brought into contact with a metal compound such as the above-mentioned metal halide or metal sulfide, or can be carried out after the contact, but from the viewpoint of efficiently carrying out the contact with a metal compound, the solvent removal is preferably carried out before the contact with a metal compound.

Solvent removal can be attained, for example, by solid-liquid separation, and a method of solid-liquid separation includes, though not specifically limited thereto, a method of centrifugation using a centrifuge, a method of using a vacuum filtration system such as a rotary vacuum filtration system, and a method of collecting a liquid through decantation. In this embodiment, in consideration of the fact that drying treatment can be optionally carried out after solvent removal and therefore a form of slurry of a solid accompanied with a liquid such as a solvent is allowable and solvent removal can be carried out in a simpler equipment, solid-liquid separation through liquid collection by decantation is preferred. More specifically, decantation can be carried out according to a method of transferring the resultant, solvent-containing sulfide solid electrolyte into a container, and then removing the supernatant of a solvent after the solid electrolyte has precipitated.

The solid substance collected through solid-liquid separation mainly contains a sulfide solid electrolyte, unreacted starting materials (for example, solid starting materials such as lithium sulfide and diphosphorus pentasulfide) and the like, and may further contain a liquid such as a solvent, that is, the collected solid substance can be in a form of slurry. The solid content in the slurry is preferably 5% by mass or more, more preferably 10% by mass, even more preferably 15% by mass, and the upper limit is preferably 50% by mass or less, more preferably 45% by mass or less, even more preferably 40% by mass or less.

When the solid content in the solid-containing slurry is made to fall within the above range through the solid separation, the balance between the scale and the cost of the apparatus to be used for solid-liquid separation and the load reducing effect in drying treatment can be good.

The solid substance mainly containing a sulfide solid electrolyte, as obtained after the above-mentioned solid-liquid separation, is in a form of slurry accompanied with a solvent, preferably, the slurry that contains a solid substance of a sulfide solid electrolyte and others is dried. By drying the slurry that contains a solid substance to remove the solvent, sulfur of a reaction side product may also be removed.

Regarding the method of removing the solid-containing slurry, any method can be appropriately selected depending on the drying treatment output for the solid-containing slurry. In the case where the amount of the solid-containing slurry is relatively small, the solid can be put on a heater such as a hot plate and heated at 50 to 140° C. to thereby evaporate the solvent, but in the case where the amount is relatively large, the solid can be dried using a drying apparatus such as various industrial-use driers.

Regarding the drying apparatus, the drying condition can be appropriately selected depending on the kind of the solvent, and in general, a drying apparatus capable of drying the slurry by heating therein at 50 to 140° C. with stirring under a reduced-pressure atmosphere of 1 to 80 kPa or so can be employed. Using such a drying apparatus, the solid substance can be more efficiently dried, and the solvent can be recovered easily. The drying apparatus of the type can be any commercially-available one such as a Henschel mixer, and an FM mixer.

The drying treatment can be carried out before contact of the sulfide solid electrolyte with a metal compound such as the above-mentioned metal halide or metal sulfide or may also be carried out after the contact, but from the viewpoint of more efficiently carrying out the contact with a metal compound and reducing the load in the drying treatment, preferably, the drying treatment is carried out after the contact with a metal compound.

This embodiment may further includes a heating treatment of optionally heating the sulfide solid electrolyte that has been processed for solid-liquid separation and optionally for drying treatment. By further heating, the amorphous sulfide solid electrolyte can be changed to an crystalline sulfide solid electrolyte.

The heating temperature in the heating treatment can be appropriately selected depending on the structure of the amorphous sulfide solid electrolyte, and can be, for example, within a range of the peak top, as a starting point, of the endothermic peak observed on the lowest temperature side in differential thermal analysis of the amorphous sulfide solid electrolyte by means of differential thermal apparatus under a heating rate of 10° C./min, preferably ±40° C., more preferably ±30° C., even more preferably ±20° C.

More specifically, the heating temperature is preferably 150° C. or higher, more preferably 170° C. or higher, even more preferably 190° C. or higher. On the other hand, the upper limit of the heating temperature is not specifically limited, and is preferably 300° C. or lower, more preferably 280° C. or lower, even more preferably 250° C. or lower.

The heating time is not specifically limited so far as a desired crystalline sulfide solid electrolyte can be produced within the time, and is, for example, preferably 1 minute or more, more preferably 10 minutes or more, even more preferably 30 minutes or more, and the upper limit of the heating time is not specifically limited, and is preferably 24 hours or less, more preferably 10 hours or less, even more preferably 5 hours or less.

Preferably, the heating treatment is carried out in an inert gas atmosphere (for example, nitrogen atmosphere, argon atmosphere), or a reduced-pressure atmosphere (especially in vacuum). This is because the crystalline solid electrolyte can be prevented from being degraded (for example, oxidized). The method of heating treatment is not specifically limited, and for example, a method of using a vacuum heating apparatus, an argon gas atmosphere furnace or a baking furnace can be employed. Industrially, a horizontal drying machine, a horizontal shaking flow drying machine or the like having a heating means and a feeding mechanism may also be employed.

The heating treatment can be carried out before contact of the sulfide solid electrolyte and a metal compound such as the above-mentioned metal halide or metal sulfide, or after the contact, the resultant metal element-containing sulfide solid electrolyte can be processed for heating treatment. From the viewpoint of more efficiently carrying out the contact with a metal compound and reducing the load for the heating treatment, preferably, the metal element-containing sulfide solid electrolyte after contact with a metal compound is processed for heating treatment.

Contact Between Sulfide Solid Electrolyte and Metal Compound

The metal compound to be used in the production method of this embodiment contains at least one metal element selected from metal elements of Groups 2 to 12 and Period 4 of the Periodic Table, and preferred examples thereof include a metal halide containing the metal element and a halogen element, a metal sulfide containing the metal element and a sulfur element, a metal phosphide containing the metal element and a phosphorus element, a metal nitride containing the metal element and a nitrogen element, and additionally an organic metal compound and a metal complex containing the metal element; and above all, a metal halide, a metal sulfide and a metal phosphide are preferred; and a metal halide and a metal sulfide are more preferred. Preferred examples of the metal halide, the metal sulfide, the metal phosphide, and the metal nitride are the same as the preferred examples of the metal halide, the metal sulfide, the metal phosphide and the metal nitride exemplified hereinabove for the metal compounds to be in the metal element-containing sulfide solid electrolyte.

In contact of the sulfide solid electrolyte and the metal compound such as the metal halide or the metal sulfide, the amount of the metal compound to be used is preferably such that the molar ratio of the metal element to the phosphorus element (M/P) in the metal element-containing sulfide solid electrolyte could fall within the above-mentioned range. The metal compound can be used alone, or can be used in a form thereof contained in, preferably dissolved in the above-mentioned water-insoluble solvent, and from the viewpoint of attaining more efficient contact therewith, the metal compound is preferably in a form contained in, more preferably dissolved in a water-insoluble solvent. In this case, the water-insoluble solvent in which the metal compound is contained can be the same as the water-insoluble solvent used in the reaction of the above-mentioned starting materials, or may differ from the latter, but in consideration of the solvent treatment, preferably, the same solvent is used. In the case where the metal compound used could not dissolve in the water-insoluble solvent used in the reaction of the starting material owing to the relationship between the metal compound and the water-insoluble solvent, needless-to-say, the water-insoluble solvent to be used along with the metal compound need not be the same as the water-insoluble solvent for use in the reaction of the starting materials, and in such a case, a water-insoluble solvent capable of dissolving a metal compound can be appropriately selected and used.

In the case where the metal compound is used in a form thereof contained in, preferably dissolved in a water-insoluble solvent, the content of the metal compound may well be approximately 0.1% by mass or more and 10% by mass or less, preferably 0.3% by mass or more and 5% by mass or less, more preferably 0.5% by mass or more and 3% by mass or less. When the content of the metal compound is made to fall within the above-mentioned range, contact between the sulfide solid electrolyte and the metal compound can be carried out more efficiently.

In the production method for the metal element-containing solid electrolyte of this embodiment, the halogen element contained in the sulfide solid electrolyte can be the same as the halogen element of the metal halide used as the above-mentioned compound, or may differ from the latter, but is preferably the same. The reason is as already described hereinabove, that is, because when the lithium halide to be produced as a side product in contact with the sulfide solid electrolyte and the metal halide is the same as the lithium halide already existing in the sulfide solid electrolyte, the influence of the side product on battery performance can be suppressed more and a sulfide solid electrolyte can be obtained in a more stable manner.

The contact between the sulfide solid electrolyte and the metal compound such as the metal halide or the metal sulfide can be carried out using a stirring tank equipped with a stirrer. The stirrer can be any one equipped with any of various types of stirring blades such as an anchor blade, a Maxblend blade, a helical blade, a paddle blade, a turbine blade, a marine propeller blade or a ribbon blade.

The condition for contact between the sulfide solid electrolyte and the metal compound is not specifically limited, and for example, the contact can be carried out at room temperature (23° C. or so), and the contact time with the stirrer can be approximately 30 minutes or more and 5 hours or less.

In the production method of this embodiment, after the contact between the sulfide solid electrolyte and the metal compound, if desired, the solvent can be removed and the product can be dried. The solvent removal and the drying treatment are as already described above.

In the case where the metal element-containing sulfide solid electrolyte obtained through the contact between the sulfide solid electrolyte and the metal compound is amorphous, if desired, it can be heated to be converted into a crystalline metal element-containing sulfide solid electrolyte. The heating treatment is as already described above.

(Contact between starting materials for use in producing sulfide solid electrolyte and metal compound)

Next, the product method (2) is described, in which the starting materials for use in producing the above-mentioned sulfide solid electrolyte, that is, two or more starting materials containing at least a lithium element, a sulfur element and a phosphorus element, preferably two or more starting materials containing a lithium element, a sulfur element, a phosphorus element and a halogen element, is brought into contact with a metal compound.

In the production method (2), the contact between various starting materials and a metal compound can be carried out, for example, in production of the sulfide solid electrolyte using various starting materials as described for the production method (1) hereinabove, a metal compound such as a metal halide or a metal sulfide is added to the starting compounds. In this case, various starting materials and a metal compounds are mixed, stirred, ground, or processed through a combination of these treatments, a solvent can be used and can be removed (through drying treatment or solid-liquid separation), and the resultant product can be dried, and these treatments are the same as those described for the production method (1) hereinabove.

The metal element-containing sulfide solid electrolyte obtained according to the production method of this embodiment can have an effect of suppressing hydrogen sulfide generation and can express excellent working environments and can therefore be favorably used for lithium batteries. In the case where lithium element is used as a conductive species, the solid electrolyte is especially favorable for the use. The metal element-containing sulfide solid electrolyte of this embodiment can be used as a positive electrode layer, or a negative electrode layer, or can also be used as an electrolyte layer, as so described hereinabove.

EXAMPLES

Next, the present invention is described specifically with reference to Examples, but the present invention is not whatsoever restricted by these Examples.

Hydrolysis Test 100 mg of the sulfide solid electrolyte of Examples and Comparative Examples was taken in a Schlenk bottle (volume: 100 mL), and at room temperature (22° C.), air having a humidity of 85% or more was introduced thereinto at a flow rate of 0.5 L/min for 120 minutes. At that time, the hydrogen sulfide amount contained in the air was measured as needed, using a hydrogen sulfide gauge ("3000-RS (Model Code)", available from AMI Corporation), and the total amount (mL/g) of hydrogen sulfide having formed in 120 minutes was calculated.

Measurement of Various Elements: ICP Emission Spectrometry

The sulfide solid electrolyte of Examples and Comparative Examples was taken in a vial bottle in an argon atmosphere, and an aqueous solution of potassium hydroxide was put into the vial bottle, and while attention was kept paid to sulfur collection, the sulfide solid electrolyte was dissolved and appropriately diluted to prepare a sample solution for analysis. Using a Paschen-Runge ICP-OES apparatus ("SPECTRO ARCOS (product name)", available from SPECTRO Corporation), this was analyzed to determine the composition thereof. As a calibration curve solution, a 1000 mg/L standard solution for ICP analysis was used for a lithium element, a phosphorus element, a sulfur element and a manganese element; a 1000 mg/L standard solution for ion chromatography was used for a chlorine element and a bromine element; and potassium iodide (special grade chemical) was used as an iodine element.

Two sample solutions for analysis were prepared for each sulfide solid electrolyte, and each sample solution was analyzed for a total of 5 times, and the measured data were averaged to give average values to constitute the composition of the analyzed sample.

Measurement of Ion Conductivity

The sulfide solid electrolyte of Examples and Comparative Examples was filled in a tablet molding machine, and given a molding pressure of 407 MPa using a minipressing machine to be formed into tablet-shaped molded articles. As an electrode, carbon was put onto both surfaces of each molded article, and again pressed using a tablet molding machine to give molded article samples for measurement (diameter: about 10 mm, thickness: 0.1 to 0.2 cm). The molded article was subjected to AC impedance measurement to measure the ion conductivity thereof. The ion conductivity value employed here is one measured at 25° C.

Example 1

Lithium sulfide ($Li_2S$), diphosphorus pentasulfide ($P_2S_5$), lithium bromide (LiBr), lithium iodide (LiI), and manganese (II) sulfide (MnS) were put into a zirconia pot (volume: 45 mL) for a planetary ball mill ("Classic Line P-7 (lot code)", available from Fritsch Japan Co., Ltd.), in such a molar ratio that $Li_2S:P_2S_5:LiBr:LiI:MnS$ could be 55.81:18.75:15.00:10.00:0.44 (Li/P=3.64, M/P=0.012, S/P=4.00 (values calculated based on the amounts used), specifically, 0.5450 g of lithium sulfide, 0.8857 g of diphosphorus pentasulfide, 0.2768 g of lithium iodide, 0.2844 g of lithium iodide, 0.0081 g of manganese sulfide, 4.0 g of dewatered toluene (water content, 10 ppm or less), and 53 g of zirconia balls (diameter: 5 mm) were put thereinto, and sealed up in an argon atmosphere. The zirconia pot was fitted to the planetary ball mill and mixed, stirred and ground all together for 40 hours at a base panel rotation speed of 500 rpm to give a product containing an amorphous metal element-containing sulfide solid electrolyte and the solvent.

In a glove box in an argon atmosphere, 10 mL of dewatered toluene was added to the product, collected in a metal vat, and after the powder (solid electrolyte) precipitated, the supernatant solvent was removed. Next, the precipitated powder was dried on a hot plate at 80° C. to give a powdery amorphous metal element-containing sulfide solid electrolyte.

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 1.

Example 2

An amorphous metal element-containing sulfide solid electrolyte was produced in the same manner as in Example 1, except that, in Example 1, the molar ratio of lithium sulfide ($Li_2S$), diphosphorus pentasulfide ($P_2S_5$), lithium bromide (LiBr), lithium iodide (LiI), and manganese bromide ($MnBr_2$) ($Li_2S:P_2S_5:LiBr:LiI:MnBr_2$) was changed to 56.01:18.67:14.93:9.96:0.44 (Li/P=3.67, M/P=0.012, S/P=4.00 (values calculated based on the amounts used)), specifically, 0.5503 g of lithium sulfide, 0.8874 g of diphosphorus pentasulfide, 0.2774 g of lithium bromide, 0.2850 g of lithium iodide and 0.020 g of manganese bromide were used.

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 1.

Comparative Example 1

An amorphous sulfide solid electrolyte was produced in the same manner as in Example 1, except that, in Example 1, the molar ratio of lithium sulfide ($Li_2S$), diphosphorus pentasulfide ($P_2S_5$), lithium bromide (LiBr), and lithium iodide (LiI) ($Li_2S$:$P_2S_5$:LiBr:LiI) was changed to 56.25:18.75:15.00:10.00 (Li/P=3.67, S/P=4.00 (values calculated based on the amounts used)), specifically, 0.5503 g of lithium sulfide, 0.8874 g of diphosphorus pentasulfide, 0.2774 g of lithium bromide, and 0.2850 g of lithium iodide were used but manganese bromide was not used.

The resultant amorphous sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous sulfide solid electrolyte was tested according to a hydrolysis test and analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)). The results are shown in Table 1.

Example 3

The amorphous metal element-containing sulfide solid electrolyte obtained in Example 1 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline metal element-containing sulfide solid electrolyte. FIG. 1 shows an XRD spectrum of the resultant crystalline metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 1.

Example 4

The amorphous metal element-containing sulfide solid electrolyte obtained in Example 2 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline metal element-containing sulfide solid electrolyte. FIG. 1 shows an XRD spectrum of the resultant crystalline metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 1.

Comparative Example 2

The amorphous sulfide solid electrolyte obtained in Comparative Example 1 was heated at 195° C. for 3 hours to be a crystalline metal element-containing sulfide solid electrolyte. The resultant crystalline sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline sulfide solid electrolyte. FIG. 1 shows an XRD spectrum of the resultant crystalline sulfide solid electrolyte. In addition, the resultant crystalline sulfide solid electrolyte was tested according to a hydrolysis test and analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and analyzed to measure the ion conductivity thereof. The results are shown in Table 1.

TABLE 1

| | Electrolyte Composition (charge-in molar ratio of starting materials) | Crystal Structure | Li/P Molar Ratio | M/P Molar Ratio | S/P Molar Ratio | Ion Conductivity (mS/cm) | Hydrogen Sulfide Generation Amount (mL/g) |
|---|---|---|---|---|---|---|---|
| Example 1 | 55.81$Li_2S$/18.75$P_2S_5$/15.00LiBr/10.00LiI/0.44MnS | amorphous | 3.57 | 0.0076 | 3.80 | — | 2.75 |
| Example 2 | 56.01$Li_2S$/18.67$P_2S_5$/14.93LiBr/9.96LiI/0.44$MnBr_2$ | amorphous | 3.55 | 0.0090 | 3.90 | — | 0.30 |
| Comparative Example 1 | 56.25$Li_2S$/18.75$P_2S_5$/15.00LiBr/10.00LiI | amorphous | 3.52 | 0 | 3.98 | — | 5.47 |

TABLE 1-continued

| | Electrolyte Composition (charge-in molar ratio of starting materials) | Crystal Structure | Li/P Molar Ratio | M/P Molar Ratio | S/P Molar Ratio | Ion Conductivity (mS/cm) | Hydrogen Sulfide Generation Amount (mL/g) |
|---|---|---|---|---|---|---|---|
| Example 3 | 55.81$Li_2$S/18.75$P_2S_5$/15.00LiBr/10.00LiI/0.44MnS | R-II | 3.61 | 0.0095 | 3.77 | 5.60 | 0.78 |
| Example 4 | 56.01$Li_2$S/18.67$P_2S_5$/14.93LiBr/9.96LiI/0.44$MnBr_2$ | R-II | 3.54 | 0.0096 | 3.84 | 5.77 | 0.93 |
| Comparative Example 2 | 56.25$Li_2$S/18.75$P_2S_5$/15.00LiBr/10.00LiI | R-II | 3.51 | 0 | 3.94 | 5.53 | 3.17 |

Note
In Table, R-II means a thio-LISICON Region II crystal structure.

Example 5

According to the same method as in Comparative Example 1, an amorphous sulfide solid electrolyte was produced (Li/P=3.67, S/P=4.00 (values calculated based on the molar ratio)).

In a Schlenk bottle (volume: 100 mL), stirrer chips, 1.0 g of the resultant amorphous sulfide solid electrolyte and 30 mL of dewatered toluene were put, and stirred with a stirrer to give a slurry, to which a solution prepared by dissolving 0.0887 g (0.444 mmol) of calcium bromide ($CaBr_2$) in 10 mL of dewatered isobutyronitrile (water content: 20 ppm or less) was dropwise added with stirring, and after the dropwise addition, this was stirred at room temperature (25° C.) for 2 hours. Subsequently, this was statically left as such, the supernatant was removed, and the residue was dried under reduced pressure at 100° C. to give a powdery amorphous metal element-containing sulfide solid electrolyte (M/P=0.12 (values calculated based on the amounts used)).

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Example 6

An amorphous metal element-containing sulfide solid electrolyte was produced in the same manner as in Example 5, except that, in Example 5, 0.1000 g (0.444 mmol) of zinc bromide ($ZnBr_2$) was used in place of calcium bromide (Li/P=3.67, M/P=0.12, S/P=4.00 (values calculated based on the amounts used)).

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Example 7

An amorphous metal element-containing sulfide solid electrolyte was produced in the same manner as in Example 5, except that, in Example 5, 0.1417 g (0.444 mmol) of zinc iodide ($ZnI_2$) was used in place of calcium bromide (Li/P=3.67, M/P=0.12, S/P=4.00 (values calculated based on the amounts used)).

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Example 8

An amorphous metal element-containing sulfide solid electrolyte was produced in the same manner as in Example 5, except that, in Example 5, 0.0953 g (0.444 mmol) of manganese (II) bromide ($MnBr_2$) was used in place of calcium bromide (Li/P=3.67, M/P=0.12, S/P=4.00 (values calculated based on the amounts used)).

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 2.

Example 9

An amorphous metal element-containing sulfide solid electrolyte was produced in the same manner as in Example 5, except that, in Example 5, 0.0477 g (0.222 mmol) of manganese (II) bromide ($MnBr_2$) was used in place of calcium bromide (Li/P=3.67, M/P=0.059, S/P=4.00 (values calculated based on the amounts used)).

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Example 10

An amorphous metal element-containing sulfide solid electrolyte was produced in the same manner as in Example 5, except that, in Example 5, 0.0095 g (0.044 mmol) of manganese (II) bromide ($MnBr_2$) was used in place of calcium bromide (Li/P=3.67, M/P=0.012, S/P=4.00 (values calculated based on the amounts used)).

The resultant amorphous metal element-containing sulfide solid electrolyte was analyzed through powdery X-ray diffractometry (XRD) using an X-ray diffractometer (Smart- Lab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 2.

Example 11

An amorphous metal element-containing sulfide solid electrolyte was produced in the same manner as in Example 5, except that, in Example 5, 0.1312 g (0.444 mmol) of iron (III) bromide ($FeBr_3$) was used in place of calcium bromide (Li/P=3.67, M/P=0.12, S/P=4.00 (values calculated based on the amounts used)).

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Example 12

An amorphous metal element-containing sulfide solid electrolyte was produced in the same manner as in Example 5, except that, in Example 5, 0.0131 g (0.044 mmol) of iron (III) bromide ($FeBr_3$) was used in place of calcium bromide (Li/P=3.67, M/P=0.012, S/P=4.00 (values calculated based on the amounts used)).

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 2.

Comparative Example 3

An amorphous sulfide solid electrolyte was produced in the same manner as in Example 5, except that, in Example 5, calcium bromide was not added and 10 mL of dewatered isobutyronitrile alone was dropwise added with stirring.

The resultant amorphous sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous sulfide solid electrolyte was tested according to a hydrolysis test. The results are shown in Table 2.

Example 13

The amorphous metal element-containing sulfide solid electrolyte obtained in Example 8 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 2.

Example 14

The amorphous metal element-containing sulfide solid electrolyte obtained in Example 9 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline metal element-containing sulfide solid electrolyte. In addition, the resultant crystalline metal element-containing sulfide solid electrolyte was tested according to a hydrolysis test, and analyzed to measure the ion conductivity thereof. The results are shown in Table 2.

Example 15

The amorphous metal element-containing sulfide solid electrolyte obtained in Example 10 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 2.

Example 16

The amorphous metal element-containing sulfide solid electrolyte obtained in Example 11 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline metal element-containing sulfide solid electrolyte. In addition, the resultant crystalline metal element-containing sulfide solid electrolyte was tested according to a hydrolysis test, and analyzed to measure the ion conductivity thereof. The results are shown in Table 2.

Example 17

The amorphous metal element-containing sulfide solid electrolyte obtained in Example 12 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline metal element-containing sulfide solid electrolyte. In addition, the resultant crystalline metal element-containing sulfide solid electrolyte was tested according to a hydrolysis test, and analyzed to measure the ion conductivity thereof. The results are shown in Table 2.

Comparative Example 4

The amorphous sulfide solid electrolyte obtained in Comparative Example 3 was heated at 195° C. for 3 hours to be a crystalline sulfide solid electrolyte. The resultant crystalline sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline sulfide solid electrolyte. FIG. 1 shows an XRD spectrum of the resultant crystalline sulfide solid electrolyte. In addition, the crystalline sulfide solid electrolyte was tested according to a hydrolysis test, and analyzed to measure the ion conductivity thereof. The results are shown in Table 2.

Example 18

A crystalline metal element-containing sulfide solid electrolyte was produced in the same manner as in Example 8, except that, in Example 8, 1.0 g of the crystalline sulfide solid electrolyte obtained in Comparative Example 2 was used in place of the amorphous sulfide solid electrolyte.

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was tested according to a hydrolysis test, and analyzed to measure the ion conductivity thereof. The results are shown in Table 2.

Example 19

A crystalline metal element-containing sulfide solid electrolyte was produced in the same manner as in Example 10, except that, in Example 10, 1.0 g of the crystalline sulfide solid electrolyte obtained in Comparative Example 2 was used in place of the amorphous sulfide solid electrolyte.

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was tested according to a hydrolysis test, and analyzed to measure the ion conductivity thereof. The results are shown in Table 2.

Comparative Example 5

A crystalline sulfide solid electrolyte was produced in the same manner as in Comparative Example 3, except that, in Comparative Example 3, 1.0 g of the crystalline sulfide solid electrolyte obtained in Comparative Example 2 was used in place of the amorphous sulfide solid electrolyte.

The resultant crystalline sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at $2\theta=19.9\pm0.5°$, and $23.6\pm0.5°$, and which confirmed formation of a crystalline sulfide solid electrolyte. FIG. 1 shows an XRD spectrum of the resultant crystalline sulfide solid electrolyte. In addition, the resultant crystalline sulfide solid electrolyte was tested according to a hydrolysis test, and analyzed to measure the ion conductivity thereof. The results are shown in Table 2.

TABLE 2

| | Electrolyte Composition before Contact Treatment (charge-in molar ratio of starting materials) Crystal Structure | Metal Compound Solvent | Metal Compound Amount Used | Crystal Structure | Li/P molar ratio | M/P molar ratio | S/P molar ratio | Ion Conductivity (mS/cm) | Hydrogen Sulfide Generation Amount (mL/g) |
|---|---|---|---|---|---|---|---|---|---|
| Example 5 | $56.25Li_2S/18.75P_2S_5/15.00LiBr/10.00LiI$ amorphous | $CaBr_2$ iBuCN | 0.0887 g (0.444 mmol) | amorphous | — | — | — | — | 3.75 |
| Example 6 | $56.25Li_2S/18.75P_2S_5/15.00LiBr/10.00LiI$ amorphous | $ZnBr_2$ iBuCN | 0.1000 g (0.444 mmol) | amorphous | — | — | — | — | 1.18 |
| Example 7 | $56.25Li_2S/18.75P_2S_5/15.00LiBr/10.00LiI$ amorphous | $ZnI_2$ iBuCN | 0.1417 g (0.444 mmol) | amorphous | — | — | — | — | 4.58 |
| Example 8 | $56.25Li_2S/18.75P_2S_5/15.00LiBr/10.00LiI$ amorphous | $MnBr_2$ iBuCN | 0.0953 g (0.444 mmol) | amorphous | 3.36 | 0.11 | 3.80 | — | 0.17 |
| Example 9 | $56.25Li_2S/18.75P_2S_5/15.00LiBr/10.00LiI$ amorphous | $MnBr_2$ iBuCN | 0.0477 g (0.222 mmol) | amorphous | — | — | — | — | 0.13 |
| Example 10 | $56.25Li_2S/18.75P_2S_5/15.00LiBr/10.00LiI$ amorphous | $MnBr_2$ iBuCN | 0.0095 g (0.044 mmol) | amorphous | 3.54 | 0.0097 | 3.84 | — | 0.15 |
| Example 11 | $56.25Li_2S/18.75P_2S_5/15.00LiBr/10.00LiI$ amorphous | $FeBr_3$ iBuCN | 0.1312 g (0.444 mmol) | amorphous | — | — | — | — | 0.010 |
| Example 12 | $56.25Li_2S/18.75P_2S_5/15.00LiBr/10.00LiI$ amorphous | $FeBr_3$ iBuCN | 0.0131 g (0.044 mmol) | amorphous | — | — | — | — | 1.08 |
| Comparative Example 3 | $56.25Li_2S/18.75P_2S_5/15.00LiBr/10.00LiI$ amorphous | no iBuCN | — | amorphous | — | — | — | — | 5.99 |
| Example 13 | $56.25Li_2S/18.75P_2S_5/15.00LiBr/10.00LiI$ amorphous | $MnBr_2$ iBuCN | 0.0953 g (0.444 mmol) | R-II | 3.31 | 0.10 | 3.79 | 3.04 | 0.11 |
| Example 14 | $56.25Li_2S/18.75P_2S_5/15.00LiBr/10.00LiI$ amorphous | $MnBr_2$ iBuCN | 0.0477 g (0.222 mmol) | R-II | — | — | — | 3.37 | 0.18 |
| Example 15 | $56.25Li_2S/18.75P_2S_5/15.00LiBr/10.00LiI$ amorphous | $MnBr_2$ iBuCN | 0.0095 g (0.044 mmol) | R-II | 3.56 | 0.010 | 3.80 | 4.75 | 0.14 |

TABLE 2-continued

| | Electrolyte Composition before Contact Treatment (charge-in molar ratio of starting materials) Crystal Structure | Metal Compound Solvent | Metal Compound Amount Used | Crystal Structure | Li/P molar ratio | M/P molar ratio | S/P molar ratio | Ion Conductivity (mS/cm) | Hydrogen Sulfide Generation Amount (mL/g) |
|---|---|---|---|---|---|---|---|---|---|
| Example 16 | 56.25Li$_2$S/18.75P$_2$S$_5$/15.00LiBr/10.00LiI amorphous | FeBr$_3$ iBuCN | 0.1312 g (0.444 mmol) | R-II | — | — | — | 3.35 | 0.010 |
| Example 17 | 56.25Li$_2$S/18.75P$_2$S$_5$/15.00LiBr/10.00LiI amorphous | FeBr$_3$ iBuCN | 0.0131 g (0.044 mmol) | R-II | — | — | — | 4.61 | 0.17 |
| Comparative Example 4 | 56.25Li$_2$S/18.75P$_2$S$_5$/15.00LiBr/10.00LiI amorphous | no iBuCN | — | R-II | — | — | — | 4.81 | 1.40 |
| Example 18 | 56.25Li$_2$S/18.75P$_2$S$_5$/15.00LiBr/10.00LiI R-II | MnBr$_2$ iBuCN | 0.0953 g (0.444 mmol) | R-II | — | — | — | 1.43 | 0.29 |
| Example 19 | 56.25Li$_2$S/18.75P$_2$S$_5$/15.00LiBr/10.00LiI R-II | MnBr$_2$ iBuCN | 0.0095 g (0.044 mmol) | R-II | — | — | — | 3.66 | 0.13 |
| Comparative Example 5 | 56.25Li$_2$S/18.75P$_2$S$_5$/15.00LiBr/10.00LiI R-II | no iBuCN | — | R-II | — | — | — | 4.73 | 5.21 |

Note
In Table. R-II means a thio-LISICON Region II crystal structure, and iBuCN means dewatered isobutyronitrile.

Example 20

Lithium sulfide (Li$_2$S), diphosphorus pentasulfide (P$_2$S$_5$), lithium chloride (LiCl), lithium bromide (LiBr), and manganese (II) sulfide (MnS) were put into a zirconia pot (volume: 45 mL) for a planetary ball mill ("Classic Line P-7 (lot code)", available from Fritsch Japan Co., Ltd.), in such a molar ratio that Li$_2$S:P$_2$S$_5$:LiCl:LiBr:MnS could be 47.00:12.50:25.00:15.00:0.50 (Li/P=5.36, M/P=0.02, S/P=4.40 (values calculated based on the amounts used), specifically, 0.2941 g of lithium sulfide, 0.3783 g of diphosphorus pentasulfide, 0.1443 g of lithium chloride, 0.1774 g of lithium bromide, 0.059 g of manganese sulfide, and 10 zirconia balls (diameter: 10 mm) were put thereinto, and sealed up in an argon atmosphere. The zirconia pot was fitted to the planetary ball mill and mixed, stirred and ground all together for 40 hours at a base panel rotation speed of 370 rpm to give an amorphous metal element-containing sulfide solid electrolyte.

The resultant amorphous metal element-containing sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 3.

Example 21

Figure 2:
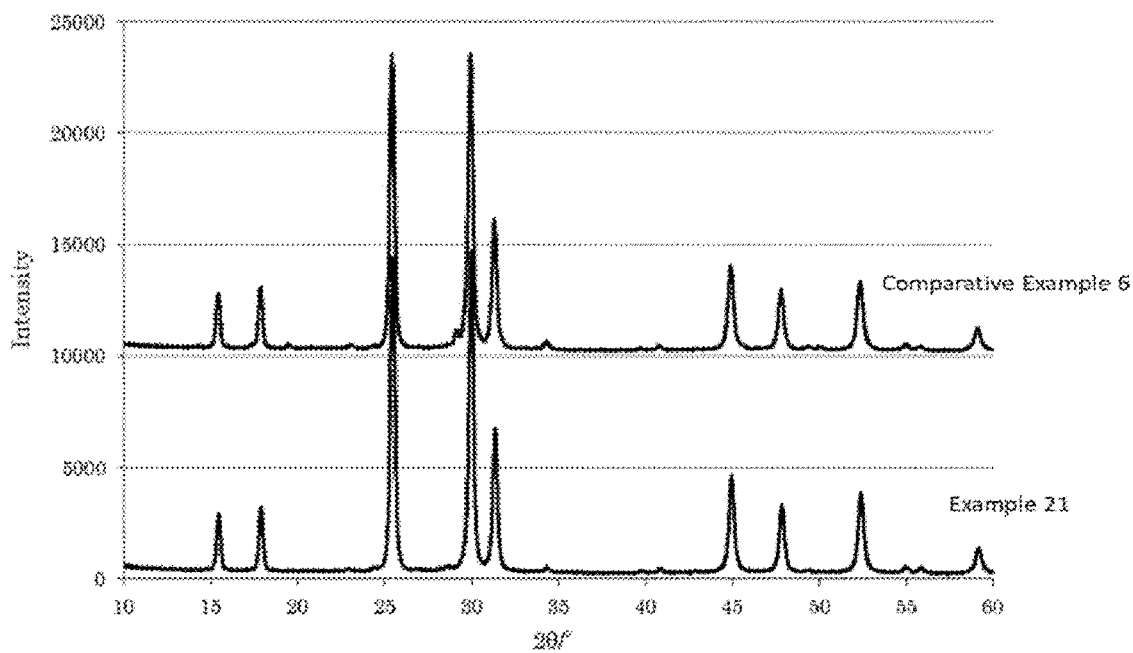
FIG. 2 shows X-ray analysis spectra of crystalline sulfide solid electrolytes of Example 21, and Comparative Example 6.

The amorphous metal element-containing sulfide solid electrolyte obtained in Example 20 was heated at 430° C. for 1 hour to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from an argyrodite-type (ARG-type) crystal structure were detected at 2θ=15.3±0.5°, 17.7±0.5°, 25.2±0.5°, 29.7±0.5°, 31.1±0.5°, 44.9±0.5°, and 47.7±0.5°, and which confirmed formation of a crystalline metal element-containing sulfide solid electrolyte. FIG. 2 shows an XRD spectrum of the resultant metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 3.

Comparative Example 6

An amorphous sulfide solid electrolyte was produced in the same manner as in Example 20, except that, in Example 20, the molar ratio of lithium sulfide (Li$_2$S), diphosphorus pentasulfide (P$_2$S$_5$), lithium chloride (LiCl) and lithium bromide (LiBr) (Li$_2$S:P$_2$S$_5$:LiCl:LiBr) was changed to 47.50:12.50:25.00:15.00 (Li/P=5.40, S/P=4.40 (values calculated based on the amounts used)), specifically, 0.2980 g of lithium sulfide, 0.3794 g of diphosphorus pentasulfide, 0.1447 g of lithium chloride, and 0.0.1779 g of lithium bromide were used but manganese sulfide was not used. The resultant amorphous solid electrolyte was heated at 430° C. for 1 hour to be a crystalline sulfide solid electrolyte.

The resultant crystalline sulfide solid electrolyte was analyzed through powdery X-ray diffractometry (XRD) using an X-ray diffractometer (SmartLab, available from Rigaku Corporation), in which crystallization peaks derived from an argyrodite-type (ARG-type) crystal structure were detected at 2θ=15.3±0.5°, 17.7±0.5°, 25.2±0.5°, 29.7±0.5°, 31.1±0.5°, 44.9±0.5°, and 47.7±0.5°, and which confirmed formation of a crystalline sulfide solid electrolyte. FIG. 2 shows an XRD spectrum of the resultant sulfide solid electrolyte. In addition, the resultant crystalline sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 3.

TABLE 3

| | Electrolyte Composition (charge-in molar ratio of starting materials) | Crystal Structure | Li/P Molar Ratio | M/P Molar Ratio | S/P Molar Ratio | Ion Conductivity (mS/cm) | Hydrogen Sulfide Generation Amount (mL/g) |
|---|---|---|---|---|---|---|---|
| Example 20 | 47.00Li$_2$S/12.50P$_2$S$_5$/25.00LiCl/15.00LiBr/0.50MnS | amorphous | 5.26 | 0.016 | 4.14 | — | 4.01 |
| Example 21 | 47.00Li$_2$S/12.50P$_2$S$_5$/25.00LiCl/15.00LiBr/0.50MnS | ARG-type | 5.33 | 0.018 | 4.09 | 9.43 | 18.83 |
| Comparative Example 6 | 47.50Li$_2$S/12.50P$_2$S$_5$/25.00LiCl/15.00LiBr | ARG-type | 5.42 | 0 | 4.35 | 10.35 | 29.81 |

Note
In Table, ARG means an argyrodite-type crystal structure.

Example 22

A crystalline metal element-containing sulfide solid electrolyte was produced in the same manner as in Example 6, except that, in Example 6, 1.0 g of the crystalline sulfide solid electrolyte obtained in Comparative Example 6 was used in place of the amorphous sulfide solid electrolyte (Li/P=5.40, M/P=0.13, S/P=4.40 (values calculated based on the amounts used)).

The resultant crystalline metal element-containing sulfide solid electrolyte was analyzed through powdery X-ray diffractometry (XRD) using an X-ray diffractometer (Smart-Lab, available from Rigaku Corporation), in which crystallization peaks derived from an argyrodite-type (ARG-type) crystal structure were detected at 2θ=15.3±0.5°, 17.7±0.5°, 29.7±0.5°, 31.1±0.5°, 44.9±0.5°, and 47.7±0.5°, and which confirmed formation of a crystalline metal-element-containing sulfide solid electrolyte. The resultant crystalline metal element-containing sulfide solid electrolyte was tested according to a hydrolysis test, and analyzed to measure the ion conductivity thereof. The results are shown in Table 4.

Example 23

A crystalline metal element-containing sulfide solid electrolyte was produced in the same manner as in Example 10, except that, in Example 10, 1.0 g of the crystalline sulfide solid electrolyte obtained in Comparative Example 6 was used in place of the amorphous sulfide solid electrolyte (Li/P=5.40, M/P=0.013, S/P=4.40 (values calculated based on the amounts used)).

The resultant crystalline metal element-containing sulfide solid electrolyte was analyzed through powdery X-ray diffractometry (XRD) using an X-ray diffractometer (Smart-Lab, available from Rigaku Corporation), in which crystallization peaks derived from an argyrodite-type (ARG-type) crystal structure were detected at 2θ=15.3±0.5°, 17.7±0.5°, 29.7±0.5°, 31.1±0.5°, 44.9±0.5°, and 47.7±0.5°, and which confirmed formation of a crystalline metal-element-containing sulfide solid electrolyte. The resultant crystalline metal element-containing sulfide solid electrolyte was tested according to a hydrolysis test, and analyzed to measure the ion conductivity thereof. The results are shown in Table 4.

TABLE 4

| | Electrolyte Composition before Contact Treatment (charge-in molar ratio of starting materials) Crystal Structure | Metal Compound Solvent | Metal Compound Amount Used | Crystal Structure | Li/P Molar Ratio | M/P Molar Ratio | Ion Conductivity (mS/cm) | Hydrogen Sulfide Generation Amount (mL/g) |
|---|---|---|---|---|---|---|---|---|
| Example 22 | 47.50Li$_2$S/12.50P$_2$S$_5$/25.00LiCl/15.00LiBr ARG | ZnBr$_2$ iBuCN | 0.1000 g (0.444 mmol) | ARG | — | — | 3.40 | 17.82 |
| Example 23 | 47.50Li$_2$S/12.50P$_2$S$_5$/25.00LiCl/15.00LiBr ARG | MnBr$_2$ iBuCN | 0.0095 g (0.044 mmol) | ARG | — | — | 5.75 | 23.57 |

Note
In Table, AUG means an argyrodite-type crystal structure, and iBuCN means isobutyronitrile.

Comparative Example 7

Lithium sulfide (Li$_2$S), diphosphorus pentasulfide (P$_2$S$_5$), lithium iodide (LiI), and manganese (II) sulfide (MnS) were put into a zirconia pot (volume: 45 mL) for a planetary ball mill ("Classic Line P-7 (lot code)", available from Fritsch Japan Co., Ltd.), in such a molar ratio that Li$_2$S:P$_2$S$_5$:LiI:MnS could be 64.42:27.88:5.77:1.92 (Li/P=2.41, M/P=0.034, S/P=3.69 (values calculated based on the amounts used), specifically, 0.2931 g of lithium sulfide, 0.6138 g of diphosphorus pentasulfide, 0.0765 g of lithium iodide, 0.0166 g of manganese sulfide, and 10 zirconia balls (diameter: 10 mm) were put thereinto, and sealed up in an argon atmosphere. The zirconia pot was fitted to the planetary ball mill and mixed, stirred and ground all together for 30 hours at a base panel rotation speed of 510 rpm to give an amorphous metal element-containing sulfide solid electrolyte.

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), and tested according to a hydrolysis test. The results are shown in Table 5.

Comparative Example 8

The amorphous metal element-containing sulfide solid electrolyte obtained in Comparative Example 7 was heated at 250° C. for 2 hours to be a crystalline metal element-containing sulfide solid electrolyte.

Figure 3:
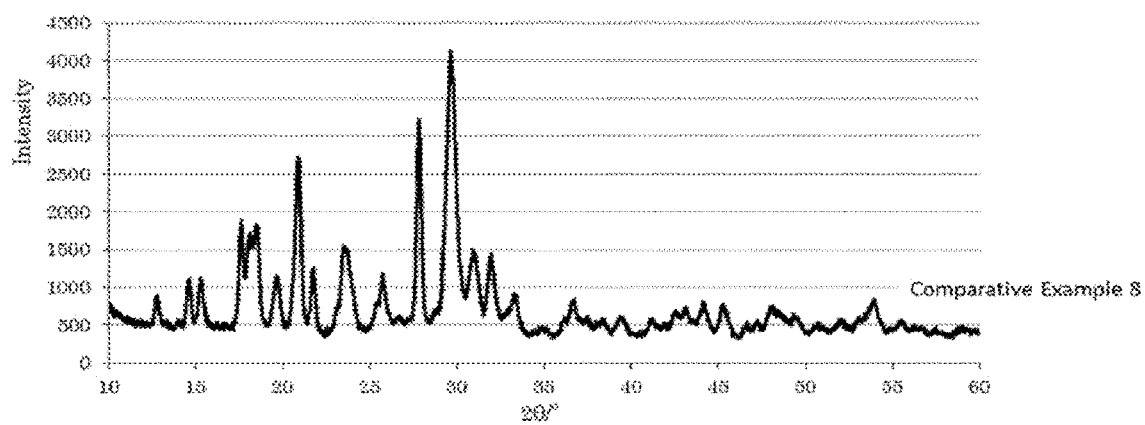
FIG. 3 shows an X-ray analysis spectrum of a crystalline sulfide solid electrolyte of Comparative Example 8.

The resultant crystalline metal element-containing sulfide solid electrolyte was analyzed through powdery X-ray diffractometry (XRD) using an X-ray diffractometer (Smart-Lab, available from Rigaku Corporation), in which crystallization peaks derived from an $Li_7P_3S_{11}$-type crystal structure were detected, and which confirmed formation of a crystalline metal element-containing sulfide solid electrolyte. FIG. 3 shows an XRD spectrum of the resultant crystalline metal element-containing sulfide solid electrolyte. In addition, the resultant crystalline metal element-containing sulfide solid electrolyte was analyzed through ICP emission spectrometry to calculate the molar ratio of the constituent elements (molar ratio of lithium element to phosphorus element (Li/P), molar ratio of metal element to phosphorus element (M/P), and molar ratio of sulfur element to phosphorus element (S/P)), tested according to a hydrolysis test, and analyzed to measure the ion conductivity thereof. The results are shown in Table 5.

TABLE 5

| | Electrolyte Composition (charge-in molar ratio of starting materials) | Crystal Structure | Li/P Molar Ratio | M/P Molar Ratio | S/P Molar Ratio | Ion Conductivity (mS/cm) | Hydrogen Sulfide Generation Amount (mL/g) |
|---|---|---|---|---|---|---|---|
| Comparative Example 7 | 64.42Li$_2$S/27.88P$_2$S$_5$/5.77LiI/1.92MnS | amorphous | 2.44 | 0.032 | 3.63 | — | 185.57 |
| Comparative Example 8 | 64.42Li$_2$S/27.88P$_2$S$_5$/5.77LiI/1.92MnS | Li$_7$P$_3$S$_{11}$-type | 2.44 | 0.034 | 3.60 | 1.3 | 181.96 |

An amorphous sulfide solid electrolyte was produced in the same manner as in Example 5, except that, in Example 5, 0.0048 g (0.022 mmol) of manganese bromide was used in place of calcium bromide (Li/P=3.67, M/P=0.006, S/P=4.00 (values calculated based on the amounts used)).

The resultant amorphous sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant solid electrolyte was tested according to a hydrolysis test. The results are shown in Table 6.

Example 25

The amorphous metal element-containing sulfide solid electrolyte obtained in Example 24 was heated at 195° C. for 3 hours to be a crystalline metal element-containing sulfide solid electrolyte. The resultant crystalline sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline metal element-containing sulfide solid electrolyte. The resultant crystalline metal element-containing sulfide solid electrolyte was tested according to a hydrolysis test, and analyzed to measure the ion conductivity thereof. The results are shown in Table 6.

Example 26

An amorphous sulfide solid electrolyte was produced in the same manner as in Example 5 except that 0.0066 g (0.022 mmol) of iron bromide was used in place of calcium bromide (Li/P=3.67, M/P=0.006, S/P=4.00 (values calculated based on the amounts used)).

The resultant amorphous sulfide solid electrolyte was analyzed through powdery X-ray diffractometry (XRD) using an X-ray diffractometer (SmartLab, available from Rigaku Corporation), which confirmed absence of any other peak than starting materials-derived peaks. In addition, the resultant solid electrolyte was tested according to a hydrolysis test. The results are shown in Table 6.

Example 27

The amorphous metal element-containing sulfide solid electrolyte obtained in Example 26 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline metal element-containing sulfide solid electrolyte. In addition, the resultant crystalline metal element-containing sulfide solid electrolyte was tested according to a hydrolysis test, and analyzed to measure the ion conductivity thereof. The results are shown in Table 6.

Comparative Example 9

An amorphous metal element-containing sulfide solid electrolyte was produced in the same manner as in Example 1, except that, in Example 1, the molar ratio of lithium sulfide (Li$_2$S), diphosphorus pentasulfide (P$_2$S$_5$), lithium bromide (LiBr), lithium iodide (LiI) and manganese sulfide (MnS) was changed to Li$_2$S:P$_2$S$_5$:LiBr:LiI:MgS of 56.25: 18.74:15.00:10.00:0.44 (Li/P=3.64, M/P=0.012, S/P=4.00 (values calculated based on the amounts used), specifically, 0.5457 g of lithium sulfide, 0.8869 g of diphosphorus pentasulfide, 0.2772 g of lithium bromide, 0.2848 g of lithium iodide, and 0.0053 g of manganese sulfide were used.

The resultant amorphous metal element-containing sulfide solid electrolyte was analyzed through powdery X-ray diffractometry (XRD) using an X-ray diffractometer (Smart-Lab, available from Rigaku Corporation), which confirmed absence of any other peak than starting materials-derived peaks. In addition, the resultant amorphous metal element-containing sulfide solid electrolyte was tested according to a hydrolysis test. The results are shown in Table 7.

Comparative Example 10

The amorphous metal element-containing sulfide solid electrolyte obtained in Comparative Example 9 was heated at 195° C. for 3 hours to be a crystalline metal element-containing sulfide solid electrolyte. The resultant crystalline metal element-containing sulfide solid electrolyte was analyzed through powdery X-ray diffractometry (XRD) using an X-ray diffractometer (SmartLab, available from Rigaku Corporation), in which crystallization peaks derived from a thio-LISICON Region II (R-II) crystal structure were detected at 2θ=19.9±0.5°, and 23.6±0.5°, and which confirmed formation of a crystalline metal element-containing sulfide solid electrolyte. FIG. 1 shows an XRD spectrum of the resultant crystalline sulfide solid electrolyte. In addition, the resultant crystalline metal element-containing sulfide solid electrolyte was tested according to a hydrolysis test, and analyzed to measure the ion conductivity thereof. The results are shown in Table 7.

From the results of Examples 24 to 27 in Table 6, it is confirmed that, containing a metal element, the solid electrolytes reduce hydrogen sulfide generation and improve the effect of suppressing hydrogen sulfide generation. On the other hand, as shown in Table 7, when magnesium in Group 2 and Period 3 of the Periodic Table is used as a metal element is used, the hydrogen sulfide generation amount is extremely large, that is, the effect of suppressing hydrogen sulfide generation of the solid electrolyte of the type is low.

It is confirmed that, in Examples 1 to 4, 8, 10, 13, 15, 20 and 21, the calculated values of the molar ratio of lithium element to phosphorus element (Li/P), the molar ratio of metal element to phosphorus element (M/P), and the molar ratio of sulfur element to phosphorus element (S/P), as calculated based on the charge-in amount of the starting materials, almost coincide with the measured values in ICP emission spectrometry.

INDUSTRIAL APPLICABILITY

The metal element-containing sulfide solid electrolyte of this embodiment has an effect of suppressing hydrogen sulfide generation and can express excellent working environments, and therefore can be favorably used for lithium

TABLE 6

| | Electrolyte Composition before Contact Treatment (charge-in molar ratio of starting materials) Crystal Structure | Metal Compound Solvent | Metal Compound Amount Used | Crystal Structure | Li/P Molar Ratio | M/P Molar Ratio | S/P Molar Ratio | Ion Conductivity (mS/cm) | Hydrogen Sulfide Generation Amount (mL/g) |
|---|---|---|---|---|---|---|---|---|---|
| Example 24 | 56.25Li$_2$S/18.75P$_2$S$_5$/15.00LiBr/10.00LiI amorphous | MnBr$_2$ iBuCN | 0.0048 g (0.022 mmol) | amorphous | — | — | — | — | 0.41 |
| Example 25 | 56.25Li$_2$S/18.75P$_2$S$_5$/15.00LiBr/10.00LiI amorphous | MnBr$_2$ iBuCN | 0.0048 g (0.022 mmol) | R-II | — | — | — | 4.70 | 0.93 |
| Example 26 | 56.25Li$_2$S/18.75P$_2$S$_5$/15.00LiBr/10.00LiI amorphous | FeBr$_3$ iBuCN | 0.0066 g (0.022 mmol) | amorphous | — | — | — | — | 0.44 |
| Example 27 | 56.25Li$_2$S/18.75P$_2$S$_5$/15.00LiBr/10.00LiI amorphous | FeBr$_3$ iBuCN | 0.0066 g (0.022 mmol) | R-II | — | — | — | 4.61 | 0.05 |

TABLE 7

| | Electrolyte Composition (charge-in molar ratio of starting materials) | Crystal Structure | Ion Conductivity (mS/cm) | Hydrogen Sulfide Generation Amount (mL/g) |
|---|---|---|---|---|
| Comparative Example 9 | 56.25Li$_2$S/18.74$_2$S$_5$/15.00LiBr/10.00LiI/0.44MgS | amorphous | — | 8.53 |
| Comparative Example 10 | 56.25Li$_2$S/18.74P$_2$S$_5$/15.00LiBr/10.00LiI/0.44MgS | R-II | 5.32 | 12.22 |

From comparison between Examples 1 and 2 and Comparative Example 1 and between Examples 3 and 4 and Comparative Example 2 in Table 1; comparison between Examples 5 to 12 and Comparative Example 3, between Examples 13 to 17 and Comparative Example 4, and between Examples 18 and 19 and Comparative Example 5 in Table 2; and comparison between Examples 20 to 23 and Comparative Example 6 in Tables 3 and 4, it is confirmed that, containing a metal element, the solid electrolytes reduce hydrogen sulfide generation and improve the effect of suppressing hydrogen sulfide generation. On the other hand, when the molar ratio of a lithium element to a phosphorus element (Li/P) is 2.4, that is, less than 3, those having an Li$_7$P$_3$S$_{11}$-type crystal structure give an extremely large amount of hydrogen sulfide generation even though containing a metal element, and the effect of suppressing hydrogen sulfide generation thereof is poor.

batteries, especially for batteries for use in information-related equipments and communication instruments such as personal computers, video cameras and mobile phones.

The invention claimed is:
1. A metal element-comprising sulfide solid electrolyte, comprising:
   a sulfide solid electrolyte comprising Li, S, P, a halogen element, and a metal element comprising at least one metal element selected from the group consisting of V, Mn, Fe, Co, Ni, Cu, Zn, Zr, Mo and Ag,
   wherein an Li/P molar ratio in the sulfide solid electrolyte is in a range of from 2.4 to 12, and an S/P molar ratio of the S to the P in the sulfide solid electrolyte is in a range of from 3.7 to 12, and
   an M/P molar ratio of the metal element to the P is in a range of from more than 0 to 0.03.

2. The metal element-comprising sulfide solid electrolyte of claim 1, wherein the metal element does not include Ba or Ti.

3. The metal element-comprising sulfide solid electrolyte of claim 1, wherein the metal element comprises at least one metal element selected from the group consisting of Mn, Fe, Co, Ni, Cu, Zn, Zr, Mo, and Ag.

4. The metal element-comprising sulfide solid electrolyte of claim 1, wherein the metal element comprises at least one metal element selected from the group consisting of V and Zn.

5. The metal element-comprising sulfide solid electrolyte of claim 1, wherein the M/P molar ratio of the metal element to the P is in a range of from 0.001 to 0.03.

6. The metal element-comprising sulfide solid electrolyte of claim 1, wherein the M/P molar ratio of the metal element to the P is in a range of from 0.001 to 0.03,
the halogen element comprises Cl, Br, and/or I, and
the metal element comprises at least one metal element selected from the group consisting of Mn, Fe, and Zn.

7. The metal element-comprising sulfide solid electrolyte of claim 1, wherein the metal element comprises at least one metal element selected from the group consisting of V, Mn, Fe, Co, Ni, Cu, Zr, Mo, and Ag.

8. The metal element-comprising sulfide solid electrolyte of claim 1, wherein the metal element does not comprise calcium.

9. The metal element-comprising sulfide solid electrolyte of claim 1, wherein the metal element comprises V.

10. The metal element-comprising sulfide solid electrolyte of claim 1, wherein the metal element comprises Mn.

11. The metal element-comprising sulfide solid electrolyte of claim 1, wherein the metal element comprises Fe.

12. A method for producing a metal element-comprising sulfide solid electrolyte, the method comprising:
bringing into contact, with a metal compound, a sulfide solid electrolyte comprising Li, S, and P, or two or more starting materials together comprising a Li, S, and P,
wherein an Li/P molar ratio in the sulfide solid electrolyte is in a range of from 2.4 to 12,
an M/P molar ratio of the metal element to the P is in a range of from more than 0 to 0.03,
an S/P molar ratio in the sulfide solid electrolyte is in a range of from 3.7 to 12, and
the metal compound comprises at least one metal element selected from the group consisting of V, Mn, Fe, Co, Ni, Cu, Zn, Zr, Mo, and Ag.

13. The method of claim 12, wherein the metal compound further comprises:
a metal halide comprising a halogen element and the metal element; and/or
a metal sulfide comprising S and the metal element.

14. The method of claim 12, wherein the sulfide solid electrolyte or the starting material further comprises a halogen element.

15. The method of claim 12, wherein the sulfide solid electrolyte or the starting material further comprises a halogen element and a metal halide, and
the halogen element in the sulfide solid electrolyte is the same as the halogen element of the metal halide.

16. The method of claim 12, wherein the metal compound comprises at least one metal element selected from the group consisting of Mn, Fe, and Zn.

17. The method of claim 12, wherein the metal compound comprises at least one metal element selected from the group consisting of Mn and Fe.

* * * * *